US007662534B2

(12) United States Patent
Kinoshita et al.

(10) Patent No.: US 7,662,534 B2
(45) Date of Patent: Feb. 16, 2010

(54) APPARATUS FOR PRODUCING TONER PRECURSOR, AND METHOD FOR THE SAME, FIBROUS TONER PRECURSOR, APPARATUS FOR PRODUCING TONER, AND METHOD FOR PRODUCING ELECTROPHOTOGRAPHIC TONER AND FINE RESIN PARTICLES

(75) Inventors: Naotoshi Kinoshita, Numazu (JP); Tetsuya Tanaka, Shizuoka (JP); Masahiro Kawamoto, Shizuoka (JP)

(73) Assignee: Ricoh Company Ltd., Tokyo (JP)

( * ) Notice: Subject to any disclaimer, the term of this patent is extended or adjusted under 35 U.S.C. 154(b) by 259 days.

(21) Appl. No.: 11/852,611

(22) Filed: Sep. 10, 2007

(65) Prior Publication Data

US 2008/0063968 A1 Mar. 13, 2008

(30) Foreign Application Priority Data

Sep. 11, 2006 (JP) ............................ 2006-246014
Nov. 7, 2006 (JP) ............................ 2006-301448
Aug. 20, 2007 (JP) ............................ 2007-214066
Aug. 22, 2007 (JP) ............................ 2007-216505

(51) Int. Cl.
*G03G 9/13* (2006.01)
*B29C 47/12* (2006.01)

(52) U.S. Cl. .................... 430/137.1; 430/104; 430/105; 430/110.1; 430/137.19; 425/66

(58) Field of Classification Search ............. 430/137.1, 430/137.19, 104, 105, 110.1; 425/66
See application file for complete search history.

(56) References Cited

U.S. PATENT DOCUMENTS

| | | | | |
|---|---|---|---|---|
| 3,379,811 | A | | 4/1968 | Hartmann et al. |
| 3,825,380 | A | * | 7/1974 | Harding et al. ............ 425/72.2 |
| 3,954,361 | A | * | 5/1976 | Page ......................... 425/72.2 |
| 5,080,569 | A | * | 1/1992 | Gubernick et al. ............ 425/7 |

(Continued)

FOREIGN PATENT DOCUMENTS

JP 3-19907 1/1991

(Continued)

OTHER PUBLICATIONS

U.S. Appl. No. 12/111,486, filed Apr. 29, 2008, Kinoshita et al.
U.S. Appl. No. 12/133,052, filed Jun. 4, 2008, Kinoshita et al.

*Primary Examiner*—Hoa V Le
(74) *Attorney, Agent, or Firm*—Oblon, Spivak, McClelland, Maier & Neustadt, L.L.P.

(57) ABSTRACT

To provide a method including processing electrophotographic toner constituent material to a fibrous fine precursor and pulverizing and cutting it to obtain a uniform fibrous toner with energy efficiency in an apparatus for producing electrophotographic toner including a nozzle unit containing a nozzle having a flow path tapering toward the nozzle hole at 2° to 20° and a gas nozzle unit containing a gas nozzle and gas flow path tapering toward the nozzle hole at 15° to 33° relative to a direction of a nozzle axis, wherein the toner constituent material containing a raw material A containing a resin and pigment, and a raw material B containing one of a low melting point resin, wax and organic solvent, is extruded from the nozzle at 150° C. to 320° C., and drawn by gas flow from the gas nozzles so as to be a fibrous fluid while controlling the flow rate.

7 Claims, 9 Drawing Sheets

U.S. PATENT DOCUMENTS

| | | | | |
|---|---|---|---|---|
| 5,087,186 | A * | 2/1992 | Buehning | 425/72.2 |
| 6,395,443 | B2 | 5/2002 | Kuroda et al. | |
| 2003/0178514 | A1 | 9/2003 | Makino et al. | |
| 2006/0032952 | A1 | 2/2006 | Kawamoto et al. | |

FOREIGN PATENT DOCUMENTS

| | | |
|---|---|---|
| JP | 4-91267 | 3/1992 |
| JP | 6-138704 | 5/1994 |
| JP | 9-244296 | 9/1997 |
| JP | 3358015 | 10/2002 |
| JP | 2002-371427 | 12/2002 |
| JP | 3550109 | 4/2004 |
| JP | 2004-332130 | 11/2004 |
| JP | 2005-4182 | 1/2005 |
| JP | 2006-106235 | 4/2006 |
| JP | 2006-106236 | 4/2006 |
| WO | WO 2006/071346 A1 | 7/2006 |

* cited by examiner

APPARATUS FOR PRODUCING TONER PRECURSOR, AND METHOD FOR THE SAME, FIBROUS TONER PRECURSOR, APPARATUS FOR PRODUCING TONER, AND METHOD FOR PRODUCING ELECTROPHOTOGRAPHIC TONER AND FINE RESIN PARTICLES

BACKGROUND OF THE INVENTION

1. Field of the Invention

The present invention relates to an apparatus and method for pulverizing a dry toner for developing a latent electrostatic image in an electrophotography, electrostatic recording and electrostatic printing, and particularly relates to a process for making a toner raw material into a fibrous shape with a method in which the toner raw material is made into the fibrous shape and pulverized to obtain particles.

Moreover, the present invention relates to a method for producing fine resin particles to produce fine particles having a uniform particle size distribution, and fine resin particles obtained by the method, and particularly, relates to a method for pulverizing a dry toner for developing a latent electrostatic image in electrophotography, electrostatic recording and electrostatic printing.

2. Description of the Related Art

Recent years, in electronic printing and electrophotographic fields, marketing needs for high resolution have been increasing. As a toner used for printing, fine resin particles having a narrow particle size distribution are needed to be used in order to improve resolution of images and letters printed on a paper sheet by using electronic devices such as copiers and printers.

A technique in which a resin used for the toner is made into uniform fine particles is essential to obtain the fine resin particles.

Conventionally, an apparatus for producing fine resin particles used for toners mainly includes: (1) an adding and kneading unit configured to add a colorant, pigment, charge controlling agent, releasing agent, hardening agent and other additives to a resin and knead them; (2) a pulverizing unit configured to pulverize the kneaded resin; and (3) a classifying unit configured to classify the pulverized resin.

However, by the apparatus including kneading, pulverizing, and classifying units, it has been difficult to obtain fine resin particles having narrow particle size distribution which meet the marketing needs. Actually, conventional fine resin particles used for toner have an average particle diameter of 5 μm to 8 μm, and it has been difficult to obtain fine resin particles having a narrow particle size distribution in good yield by the above apparatus. This is because the resin is excessively pulverized during pulverization, and additionally, because a large amount of resin particles that fall out of a desired size range needs to be removed during classification in order to obtain a particle size distribution of desired range.

To overcome the above drawback, it has been proposed an apparatus for producing fine resin particles by drawing a toner raw material extruded from a kneader into a fibrous shape using a roller (drawing) and cutting it with a cutter (Japanese Patent Application (JP-A) No. 06-138704).

The apparatus disclosed in JP-A 06-138704 intends to obtain a resin powder with a narrow particle size distribution by kneading and heating a resin as a toner raw material in a kneader, extruding the melted resin through a die into a string shape, drawing the string-shaped resin into a fibrous shape by a roller followed by solidification, and cutting the produced fibrous resin.

However, in the apparatus disclosed in JP-A 06-138704, the resin extruded from the kneader is drawn into the fibrous shape by the roller. In case that the resin is broken in a drawing step by any cause, the fibrous resin cannot be fed to a next step of cutting step, and then production of the fine resin particles have to be interrupted or variation in diameters of the fibrous resin is caused.

This may lead to reduced production efficiency, which will be a big problem in terms of production of fine resin particles on a commercial scale. When the fine resin particles are produced by cutting the fibrous resin, variation is caused in the particle diameters. Moreover, in the method for drawing the fibrous resin by the roller, it is generally difficult to stably produce a fibrous fine resin having a diameter of 10 μm or less on a commercial basis, unless particular methods such as a method for producing a sea-island structure composite fiber using an incompatible two-component polymer blend, and a method for producing easily splittable fiber are used in combination.

Thus, in the method disclosed in JP-A 06-138704, it is practically impossible to stably and efficiently produce a fine fiber using the commonly used resin material, specifically, a resin material which is not optimized for making into the fiber.

As an apparatus for efficiently producing a fibrous fine resin, a spinning die for a melt-blow type nonwoven fabric has been proposed (Japanese Patent Application (JP-A) No. 2002-371427).

The spinning die disclosed in JP-A 2002-371427 is so configured as to extrude a melted resin along with hot air from a nozzle, and then introduce the extruded resin along with cold air to an outlet of spinning machine so as to cool and make the resin into a fibrous shape.

By the method disclosed in JP-A 2002-371427, even if the resin is broken by any cause, diameter variations are hard to occur because drawing is performed immediately after the raw material resin has been discharged from the spinning die.

The spinning die described in JP-A 2002-371427 has been originally developed for producing a nonwoven fabric and not been intended for other applications.

Therefore, it is necessary to find a new optimum operational condition of the spinning die in order to use the spinning die disclosed in 2002-371427 for producing toner and fine resin particles intended for powder coating, and there leaves room for improvement in order to combine the spinning die in an apparatus for producing fine resin particles, for example, devising arrangement of the spinning die.

Attempts have been made to apply the spinning die and apparatus disclosed in JP-A 2002-371427 to an apparatus for processing toner raw material into a fibrous shape (see JP-A 2004-332130).

Specifically, JP-A 2004-332130 discloses an operational condition and installation condition under which the apparatus of JP-A 2002-371427 is applied to a toner. That is, JP-A 2004-332130 discloses a cooling mechanism and its arrangement, and optimum conditions such as optimum temperature and amount of air used for drawing as operational conditions on the basis of the apparatus of JP-A 2002-371427.

Moreover, JP-A 2006-106235 discloses a production method and apparatus contains a requirement ([0020] and FIG. 2) similar to a requirement disclosed in JP-A 2004-332130, and a static mixer disposed after kneading step and before pulverizing part is provided, and an operational condition is mentioned as well.

Furthermore, it is proposed that a pulverizing step after the toner raw material is processed into the fibrous shape and shape control taking advantage of a post-step (JP-A 2006-106236).

However, JP-A 2004-332130 leaves room for improvement, for example, devising the spinning die suitable for the toner raw material, shape of a nozzle hole, and structures of the apparatus for feeding the toner raw material to the spinning die, and flow path.

Moreover, there is room to propose a process for raw material which is suitable for the method disclosed in JP-A 2004-332130 in terms of a surface of the raw material.

JP-A 2006-106235 leaves room for improvement in the apparatus and structure, as well.

JP-A 2006-106236 resulted from an improvement of various processes does not disclose improvement of particle size distribution, and the particle size distribution of the toner is needed to be improved by improving a pre-process of a method for processing a toner into a fibrous shape.

The concept of JP-A Nos. 06-138704, 2002-371427, 2004-332130, 2006-106235, and 2006-106236 are such that a raw material is efficiently distributed to be a uniform size in advance, and then cut or pulverized so as to have toner particles having a sharp particle size distribution as an final product, and have been broadly studied for the purpose of improvement of yield and reduction of energy. However, in JP-A Nos. 06-138704, 2002-371427, 2004-332130, 2006-106235, and 2006-106236, a toner is processed into a fibrous shape, and recovered once as it is, and then the fibrous-shaped toner is pulverized or cut to obtain fine particles by means of a secondary apparatus. Thus, it leaves much room to improve efficiency of pulverization.

JP-A 2005-004182 discloses a technique in which efficiency of pulverization is improved and generation of fine powder is suppressed by pulverizing a toner material containing a gaseous substance finely dispersed in a resin. This is an excellent idea for reduction of pulverization energy, but variations of particle size distribution occurs as in the case of conventional pulverization and classification.

BRIEF SUMMARY OF THE INVENTION

The present invention has been accomplished in view of the prior art, and an object of the present invention is to provide an apparatus and method for producing a toner precursor, which has excellent energy efficiency, by processing constituent materials for an electrophotographic toner to a fibrous fine precursor and subsequently pulverizing and cutting to obtain a uniform fibrous toner and a fibrous toner precursor produced by the method for producing a toner precursor, and an apparatus for producing a toner and an electrophotographic toner.

<1> An apparatus for producing a toner precursor including at least a nozzle unit which contains nozzles each containing a nozzle hole and a flow path, and a gas nozzle unit which contains gas nozzles and a gas flow path, the flow path tapering toward the nozzle hole at an angle of 2° to 20° relative to a direction of a nozzle axis, the gas flow path tapering toward the nozzle hole at an angle of 15° to 33° relative to the direction of the nozzle axis, the shortest distance between the center of the nozzle hole and the gas nozzle being 0.5D to 3D, where D represents a circle-converted diameter of an outlet opening of the nozzle hole, wherein a toner constituent material is extruded from the nozzle controlled at 150° C. to 320° C., and drawn by a gas flow from the gas nozzle so as to be a fibrous fluid, while controlling a flow rate, and wherein the toner constituent material contains a raw material A containing at least a resin and pigment, and a raw material B containing at least one of a low melting point resin, wax and organic solvent.

<2> The apparatus for producing a toner precursor according to <1>, wherein the outlet opening of the nozzle is a circular shape and has a circularity of 0.9 or more.

<3> The apparatus for producing a toner precursor according to any of <1> and <2>, wherein the flow path leading to the outlet opening of the nozzle has a straight body part, and the straight body part has a length of 5D to 15D.

<4> The apparatus for producing a toner precursor according to any of <1> to <3>, wherein the gas nozzles have a slit-shape and are of the same width, the gas nozzles are disposed in parallel across the nozzle, and the gas nozzles have a laval structure.

<5> The apparatus for producing a toner precursor according to any of <1> to <4>, further including an extruder, wherein the nozzle unit contains a plurality of aligned nozzle holes, wherein a distribution flow path to each fan-shaped unit which is disposed in each of the plurality of nozzle holes is a tournament-form flow path having a mixing function, and wherein the raw material A is mixed and kneaded by the extruder, and then the raw material A is sufficiently mixed with the raw material B.

<6> A method for producing a toner precursor including mixing and kneading two kinds of raw materials so as to produce a mixture fluid, controlling a flow rate of the mixture fluid, and extruding and drawing the mixture fluid from a nozzle by a gas supplied to a nozzle tip so as to be processed to a fibrous fine particle precursor, wherein the method for producing a toner precursor uses an apparatus for producing the toner precursor according to any of <1> to <5> is used.

<7> A fibrous toner precursor produced by a method for producing a toner precursor according to <6>.

<8> An apparatus for producing an electrophotographic toner including an apparatus for producing a toner precursor according to any of <1> to <5>, a unit configured to cut and process the obtained toner precursor from the apparatus for producing a toner precursor, and a unit configured to pulverize the cut and processed toner precursor.

<9> An electrophotographic toner containing a fibrous toner precursor according to <7>, wherein the electrophotographic toner is produced by using an apparatus for producing an electrophotographic toner according to <8>.

The second embodiment of the present invention, in a production method in which a resin or a resin mixture is made into a fibrous shape and pulverized to obtain fine particles having uniform particle size distribution, a fibrous fine particle precursor having fine air gaps inside is obtained and then made into fine particles.

<10> A method for producing fine resin particles including making a resin or resin mixture into a fibrous fine particle precursor, and pulverizing the fibrous fine particle precursor so as to obtain fine particles having a uniform particle size distribution, wherein the fibrous fine particle precursor contains a fine air gap having a size of ⅓ or less of the fiber diameter inside.

<11> The method for producing fine resin particles according to <10>, wherein the fibrous fine particle precursor is obtained, after a gaseous substance is mixed in the standard state.

<12> The method for producing fine resin particles according to <11>, wherein the gas is mixed in the resin in a supercritical state.

<13> Fine resin particles obtained by pulverizing a resin using the method for producing the fine resin particles according to any of <10> to <12>.

<14> The fine resin particles according to <13>, wherein the fine resin particles are electrophotographic toner particles.

DETAILED DESCRIPTION OF THE INVENTION

Hereinafter, the embodiments of the present invention will be explained with reference to the drawings.

Meanwhile, modifications and changes are easily made within the scope of claims of the present invention to make other embodiments by a person skilled in the art, and these modification and changes should be included in the scope of the present invention. The explanation hereinafter is only an example of the best mode of the present invention, and not limit the scope of the claims.

Figure 1:
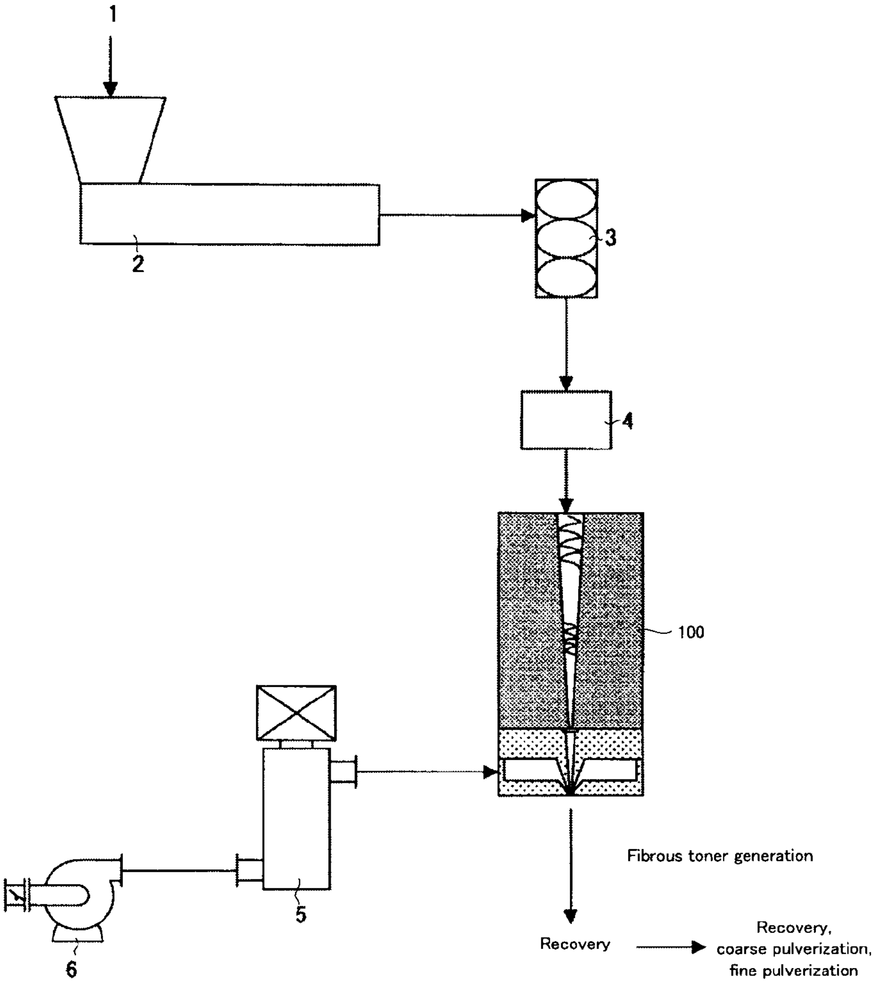
FIG. 1 shows an example of an apparatus for producing fibrous toner precursor of the present invention.

FIG. 1 shows an example of an apparatus for producing a fibrous toner precursor (hereinafter referred to as fibrous toner) of the present invention. The apparatus contains an extruder 2, a static mixer 3, a gear pump 4, a gas heating unit 6, a gas supplying unit 5, and a distribution flow path unit 100.

The present invention is characterized in that, by using the apparatus, a kneaded material containing any of a resin, wax, pigment and charge controlling agent is melted or diluted with a solvent, and extruded from an extrusion nozzle and the melted/dissolved material from the extrusion nozzle is drawn by high-temperature high-pressure gas flow supplied from a slit-shaped laval nozzle having acceleration mechanism so as to process the extruded material into a fine fibrous shape.

By using the apparatus of the present invention, the shape of the nozzles and the condition of gas flow are so optimized that a toner precursor having superior quality to the conventional ones can be produced.

Specifically, an apparatus for producing an electrophotographic toner, in which a toner constituent material is extruded from a nozzle hole and then drawn by high-pressure gas flow so as to be processed into a fibrous shape, has a unit configured to feed a raw material fluid to the nozzle hole by tapering at an appropriate angle. Thus, discharge pulsation can be decreased and more uniform fibrous toner having less variation in the fiber diameters can be obtained.

The apparatus for producing an electrophotographic toner, having the unit configured to feed the raw material fluid to the nozzle hole by tapering at an appropriate angle, enables to avoid generation of accumulated materials in a flow path and enables to make a thermal history of the raw material fluid uniform, and thus homogenous raw material fluid can be fed to each nozzle. Thus, short-term and long-term variations in physical properties of the fibrous toner are decreased and a fibrous toner having less variation in the fiber diameters and better quality can be produced.

(Angle of Nozzle)

The angle at which the structure of nozzle unit tapering toward the nozzle hole is 2° to 20°, preferably 3° to 17°, and more preferably 3.5° to 15°.

The nozzle having an angle of 15° or less can prevent formation of, so-called, polymer die, or accumulation part, and suppress formation of a deteriorated substance in Theological, physical properties of the raw material suitable for a toner. Moreover, an apparatus capable of producing a fibrous toner which can produce a toner having superior physical properties can be provided.

The nozzle having an angle of 2° or less needs longer distance for taper and makes the apparatus size larger; thus, it is not rational as an apparatus or component. However, the nozzle having an angle of 2° or less does not form a polymer die, and a functional problem does not occur. The lower limit is set, for example, 2° or more, more preferably 3° or more, and still more preferably 3.5° or more so as not to be an irrational size as the apparatus or component. The lower limit is not limited thereto, when the configuration is based on a rational design concept such as dimensional coordination.

Examples of tapering units include a conically-tapering configuration, and a slit flow path configured to be thinner.

(Nozzle Hole)

Figure 2:
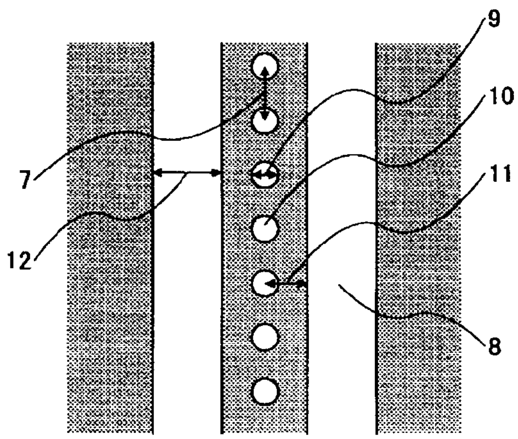
FIG. 2 shows a schematic view of an example of a nozzle unit viewed from a direction of a nozzle hole outlet.

Linearly aligned nozzle holes are, for example, the nozzle holes viewed from a side of a nozzle hole outlet as shown in FIG. 2.

In the present invention circular nozzle holes are aligned at equal intervals. Slits that are disposed in parallel across the nozzle holes are nozzles where high-temperature gas flows are discharged.

Figure 3A:
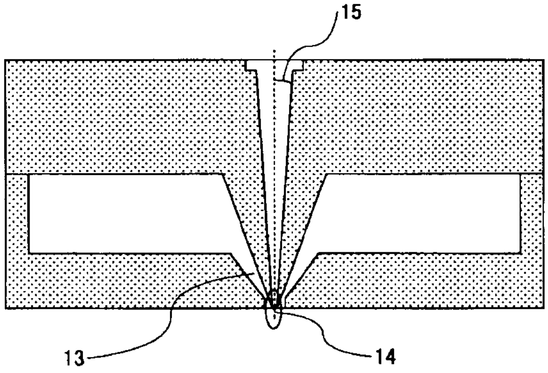
FIG. 3A shows an example of a cross-section vertical to an alignment direction of nozzles in a nozzle unit containing a supplying part of high-pressure gas, which illustrates a taper angle immediately anterior to a nozzle.
Figure 4:
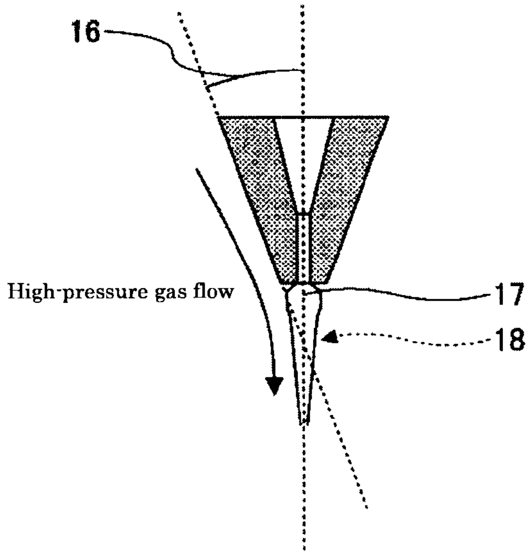
FIG. 4 shows an enlarged view of a cross section of a nozzle hole part of a nozzle unit, which illustrates Barus effect and an angle of high-pressure gas flow.

The gas flow supplied at an angle to a direction of the nozzle is, for example, shown in FIGS. 3A and 4.

FIG. 3A shows a cross-sectional view vertical to an alignment direction of nozzle holes in a nozzle unit having aligned nozzle holes. As shown in FIG. 2, slits where high-temperature gas flows are discharged are disposed across the nozzle holes. FIG. 4 is an enlarged view of a tip of the nozzle hole. As shown in FIG. 4, the high-temperature gas flow is supplied along a wall of a nozzle tip.

Figure 3B:
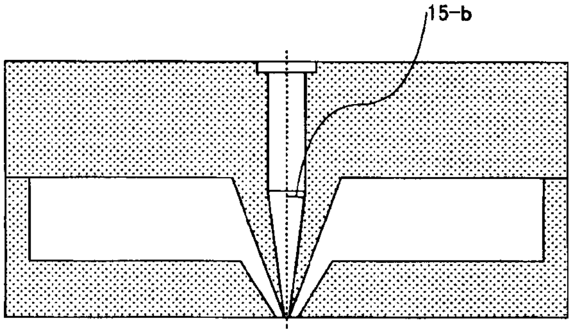
FIG. 3B shows an example of a cross-section vertical to an alignment direction of nozzles in a nozzle unit containing a tapered configuration having a step (level change).

A mechanism tapering toward the nozzle hole in the nozzle unit is, for example, a configuration as shown in FIG. 3A. The flow path is gradually narrowed from upstream to downstream. However, it is not necessary to taper at the same angle at every position, and as shown in FIG. 3B, the flow path may have a tapered configuration having a step in order to change an angle at a certain position and to adjust position or distance, in view of configuration or fabrication. However, it should be avoided to have a tapered configuration having a step, which repeats expansion of once tapered flow path again. When there is no particular reason, the nozzle preferably tapers at an angle of 2° to 20°.

Figure 8:
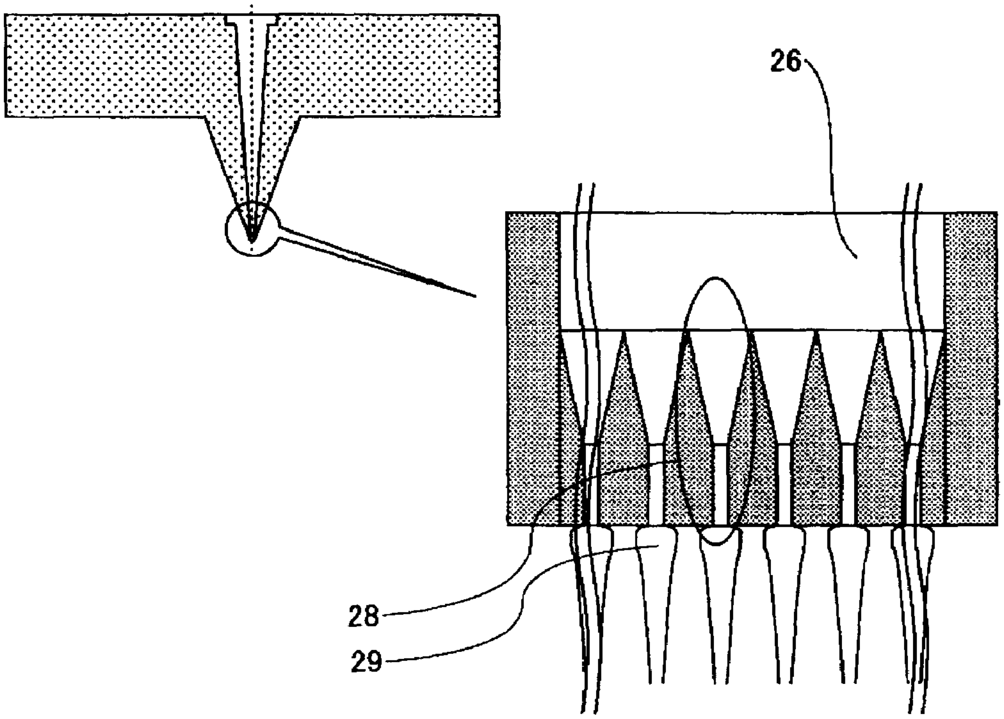
FIG. 8 shows an example of an arrangement of nozzle holes, which is a cross section parallel to an alignment direction of the nozzle holes.

Meanwhile, a nozzle unit having aligned nozzle holes, as viewed from a side cross section, is as shown in FIG. 8.

FIG. 8 shows a cross sectional view parallel to a direction of aligned nozzle holes through the center of each nozzle hole.

The tip of the nozzle hole preferably has a straight body part which will be explained hereinafter and upstream of the straight body part is preferably configured to conically taper. The straight body part conically tapers preferably at 2° C. to 45° C. and more preferably at 10° to 30°.

(High-Pressure Gas)

A high-temperature gas is collided into the tip of the nozzle hole at a certain angle to a direction toward the nozzle, so that energy is efficiently transferred to the raw material flow.

(Angle of Supplying High-temperature Gas)

The high-temperature gas is preferably supplied at 15° to 33° and preferably 18° to 27° in view of the balance with drawing properties of the toner raw material.

As a high-temperature gas, air is generally used. When the flow rate, mass, velocity of flow from the gas nozzle is increased, drawing efficiency is improved.

For example, it is possible to increase flow rate by increasing the width of slits through which the high-pressure gas is discharged. In addition, humidified air and steam can be used as the means for increasing mass. Examples of the means for increasing discharge speed include a means for increasing supply pressure of the high-temperature gas flow, and a means for using low-molecular mass gas such as hydrogen and helium as the high-temperature gas.

When there is a concern that the raw material may undergo oxidization or degradation, inert gas such as nitrogen gas or argon gas may be used.

The pressure of the high-pressure gas is preferably approximately 0 kPa to 500 kPa, more preferably 0 kPa to 200 kPa, and still more preferably 0 kPa to 100 kPa.

The temperature of the high-pressure gas is 150° C. to 350° C. preferably 170° C. to 280° C. and more preferably 180° C. to 250° C.

Examples of the gas heating units include known electric heaters, steam heaters and gas heaters.

Known toner has an average particle diameter of 12 μm or less, and when fibrous toner is processed by a pulverization/cut apparatus capable of pulverization or cutting of fibrous toner, the cut length is approximately 1.2 to 1.5 times as large as fiber diameter on average. For this reason, in general, toner particles having good quality cannot be obtained unless the fiber diameter is made to be 8 μm or less. The coefficient of variation in the fiber diameters is preferably at least less than 17, and more preferably less than 16.

(Formulation of Materials)

In the present invention an apparatus is employed which uses a mixture fluid in which a raw material A containing at least a resin and a pigment is diluted with a raw material B containing at least one of a low melting point resin, wax and organic solvent, and in which the mixture fluid is extruded from an extrusion nozzle unit having a plurality of aligned extrusion nozzle holes controlled at 150° C. to 320° C. while controlling its flow rate. In this apparatus, 3% by mass or more, more preferably 5% by mass or more, of the raw material B is further contained, whereby the apparent viscosity of the total raw material fluid (melted raw material, dissolved raw material, or slurry raw material) decreases, resulting in increased processibility of the fibrous toner.

Examples of the resins for the raw material A include styrene mono-polymers such as polystyrenes, poly-p-chlorostyrenes, polyvinyltoluenes, and substituted styrenes; styrene copolymers such as styrene-p-chlorostyrene copolymers, styrene-vinyltoluene copolymers, styrene-vinylnaphthalene copolymers, styrene-acryl ester copolymers, styrene-methacrylate copolymers, styrene-α-chloromethylmethacrylate copolymers, styrene-acrylonitrile copolymers, styrene-vinylmethylether copolymers, styrene-vinylethylether copolymers, styrene-vinylmethylketone copolymers, styrene-butadiene copolymers, styrene-isoprene copolymers, styrene-acrylonitrile-indene copolymers; polyvinyl chloride; phenol reisin; naturally denaturated phenol resin; naturally denaturated maleic acid resin; acrylic resin; methacrylic resin; polyvinyl acetate; silicone resin; polyester resin; polyurethane; polyamide resin; furan resin; epoxy resin; xylene resin; polyvinyl butyral; terpene resin; coumarone-indene resin; and petroleum resin. Styrene copolymers and polyester resins are preferable as a binder resins. These may be used alone or in combination.

Examples of the pigments for the raw material A include inorganic pigments such as chrome yellow, zinc yellow, barium yellow, cadmium yellow, zinc sulfide, antimony white, cadmium red, barium sulfate, lead sulfate, strontium sulfate, zinc white, titanium white, colcothar, iron black, chromium oxide, aluminum hydroxide, calcium silicate, ultramarine blue, calcium carbonate, magnesium carbonate, carbon black, graphite, aluminum pigment powder, bronze powder, and organic pigments such as Madder lake, Logwood lake, cochineal lake, naphthol green B, naphthol green Y, naphthol yellow S, lithol fast yellow 2G, permanent red 4R, brilliant fast scarlet, hansa yellow, lithol red, lake red C, lake red D, brilliant carmine 6B, permanent red F5R, pigment scarlet 3B, bordeaux 10B, phthalocyanine blue, phthalocyanine green, sky blue, rhodamine lake, malachite green lake, eosin lake, quinoline yellow lake, indanthrene blue, thioindigo maroon, alizarin lake, quinacridone red, quinacridone violet, Perylene Red, Perylene scarlet, isoindolinone yellow, dioxazine violet, and aniline black. These may be used alone or in combination.

In addition to the resin and pigment the raw material A may contain a charge controlling agent and a magnetic material. Examples of the charge controlling agent include plant wax such as candelilla wax, carnauba wax, rice wax; mineral wax such as montan wax, ceresin wax; petroleum wax such as paraffin wax, petrolatum; synthetic hydrocarbons such as polypropylene, polyethylene; hydrogenated wax such as hardened castor oil, hardened castor oil derivative; fatty acid derivative such as alcohol, ester, amide, imide, ketone, and metal soap. Examples of the magnetic materials include magnetite, ferrite and iron oxide.

Examples of the low melting point resins of the raw material B include styrene mono-polymers such as polystyrenes, poly-p-chlorostyrenes, polyvinyltoluenes, and substituted styrenes; styrene copolymers such as styrene-p-chlorostyrene copolymers, styrene-vinyltoluene copolymers, styrene-vinylnaphthalene copolymers, styrene-acryl ester copolymers, styrene-methacrylate copolymers, styrene-α-chloromethylmethacrylate copolymers, styrene-acrylonitrile copolymers, styrene-vinylmethylether copolymers, styrene-vinylethylether copolymers, styrene-vinylmethylketone copolymers, styrene-butadiene copolymers, styrene-isoprene copolymers, styrene-acrylonitrile-indene copolymers; polyvinyl chloride; phenol resins; naturally denaturated phenol resins; naturally denaturated maleic acid resins; acrylic resins; methacrylic resins; polyvinyl acetates; silicone resins; polyester resins; polyurethanes; polyamide resins; furan resins; epoxy resins; xylene resins; polyvinyl butyrals; terpene resins; coumarone-indene resins; and petroleum resins. Styrene copolymers and polyester resins are preferable as binder resins. These may be used alone or in combination.

Examples of the wax for the raw material B include plant wax such as candelilla wax, carnauba wax, rice wax; mineral wax such as montan wax, ceresin wax; petroleum wax such as paraffin wax, petrolatum; synthetic hydrocarbons such as polypropylene, polyethylene; hydrogenated wax such as hardened castor oil, hardened castor oil derivative; fatty acid derivative such as alcohol, ester, amide, imide, ketone, and metal soap. These may be used alone or in combination.

Examples of the organic solvents for the raw material B include hydrocarbons such as hexane, octane, petroleum ether, cyclohexane, benzene, toluene, and xylene; ethers such as ethyl ether, dimethyl glycol, trioxane and tetrahydrofuran; acetals such as methylal and diethylene acetal; ketones such as acetone, methyl ethyl ketone, methyl isobutyl ketone, and cyclohexane; esters such as butyl formate, butyl acetate, ethyl propionate, and cellosolve acetate; acids such as formic acid, acetic acid and propionic acid; sulfur- or nitrogen-containing organic compounds such as nitropropene, nitrobenzene, dimethylamine, monoethanolamine, pyridine, dimethylsulfoxide, and dimethylformamide.

As a means for diluting the raw material A with the raw material B, a kneader such as a known extruder can be used. Examples of methods for controlling the flow rate include a method for controlling volume flow by a known gear pump, a method for controlling the flow rate by means of a rotation number of an extruder, and a method for controlling the flow rate by means of feed rate of a feeder configured to feed the raw material. For the feeder configured to feed the raw material to the extruder, known feeders for powder or fluid may be used. For a controlled parameter, mass variation, specifically, a decreased amount of mass per unit time may be used. Note that the raw materials A and B are not necessarily dissolved or mutually dissolved.

In the present invention, a collision state between the nozzle hole outlet and gas flow is so controlled that the variation in the thickness of the fibrous toner becomes less, or uniformity of the variation is improved, and yield is increased.

The shortest distance of the center of the outlet opening of the nozzle, or an opening surface of the nozzle hole, and the nozzle hole surface of the gas nozzle is preferably 0.5D to 3D, more preferably 0.7D to 2D in view of improvement of yield.

In the apparatus of the present invention, fiber diameter is correlated to feed rate per nozzle (i.e., feed rate increases/decreases with increasing/decreasing fiber diameter, though not proportionally), and the feed rate is a control factor of the fiber diameter in the apparatus. Nozzles of smaller diameter are suitable to obtain finer fibrous toner. The nozzle diameter is preferably 2D or less in view of necessity of controlling the fiber diameter to a smaller diameter for manufacturing reasons.

In the present invention, a suitable draw ratio is such that a ratio of "D/fiber diameter DB" is 10 fold to 200 fold, and more preferably 20 fold to 50 fold.

Figure 7:
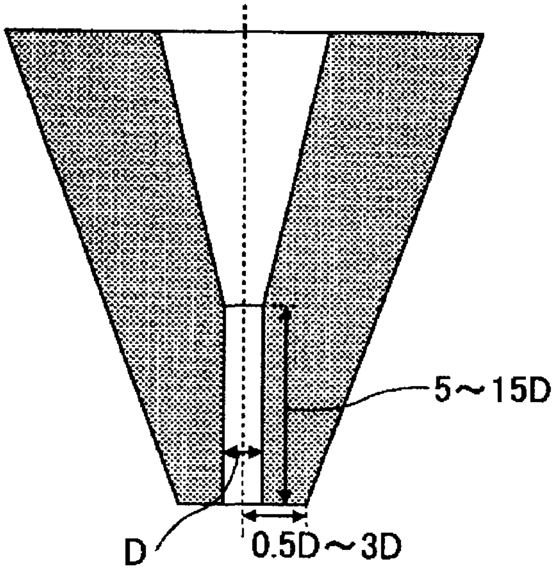
FIG. 7 shows an enlarged view of a cross section of a nozzle hole part of a nozzle unit, which illustrates a relation of diameter and length of the nozzle hole.
Figure 9:
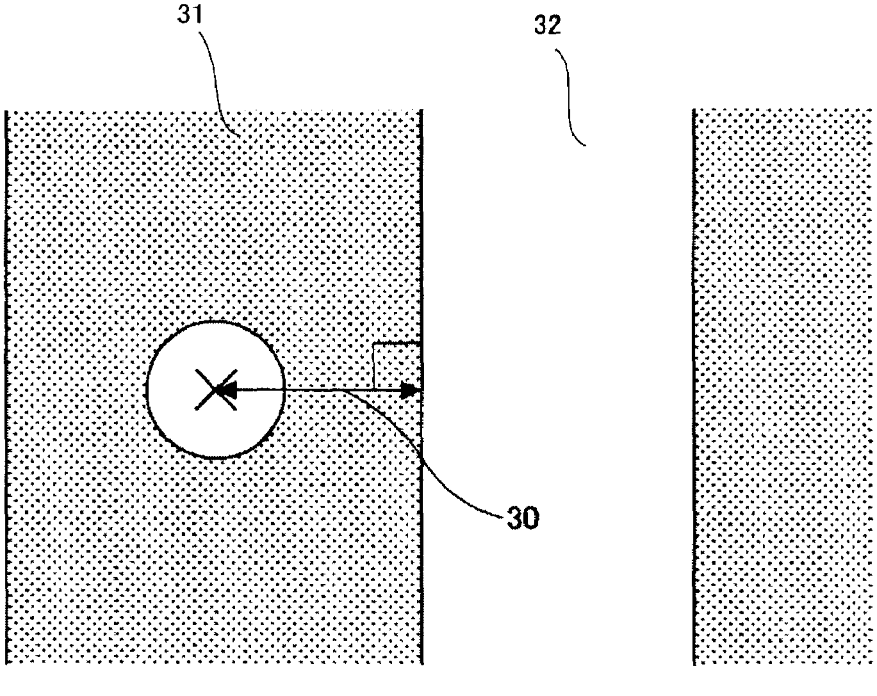
FIG. 9 shows an explanatory view of an example of a shortest distance between the center of an opening surface and a nozzle hole surface of a gas nozzle.

As shown in FIGS. 2, 7 and 9, the shortest distance between the center of the opening surface of the nozzle hole and the nozzle hole surface of the gas nozzle means a shortest distance between the center of the nozzle hole and the gas nozzle part. In FIG. 9, 31 denotes a tip of the nozzle hole, and 32 denotes a slit where high-temperature gas flow is discharged.

The raw material of the above-described toner material generally shows Barus effect in the nozzle outlet. The Barus effect is, for example, as shown in FIG. 4, a phenomenon in which the diameter of an extruded material becomes larger immediately after discharge from the nozzle hole. After the resin is extruded from the nozzle hole, it once increases its diameter by Barus effect, and then drawn by the gas flow.

Therefore, when the shortest distance is only less than 0.7D, high-temperature air may partly affect a swelled part by Barus effect, and thus the fibrous toner is nonstationarily cut, and fused with an adjacent fibrous toner by vibration for aggregation.

When the shortest distance is 3D or more, similarly, the fibrous toner is nonstationarily cut, and fused with an adjacent fibrous toner by vibration for aggregation.

This may be considered that the distance between the swelled part by Barus effect and an air influx part became so large that turbulent flow was generated around the nozzle outlet.

When drawing velocity is increased, the extruded material is contracted by drawing effect from the nozzle hole (a drawing phenomenon). Even when the extruded material is stationarily processed in the drawing phenomenon, the similar shortest distance is necessary. This is because it is necessary to go through a state as shown in FIG. 4 in order to stabilize the extruded material in the drawing phenomenon, and in an apparatus configuration in which the state of FIG. 4 is not stabilized, breakage frequently occurs, and high-speed drawing which causes the drawing phenomenon cannot be performed.

Figure 10A:
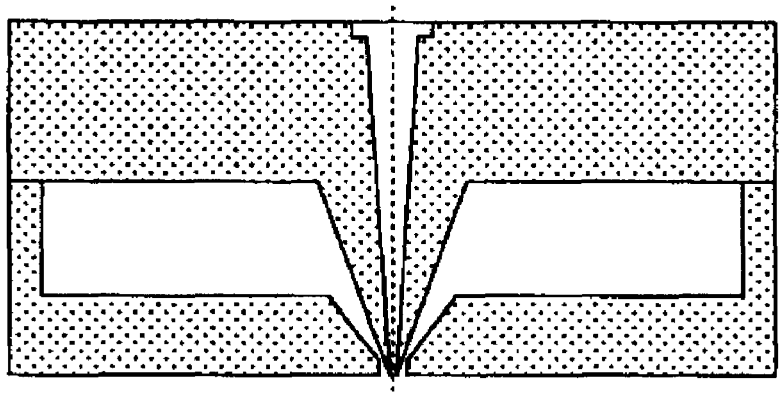
FIGS. 10A to 10C show relations of a nozzle hole and an discharge surface of a gas nozzle.
Figure 10B:
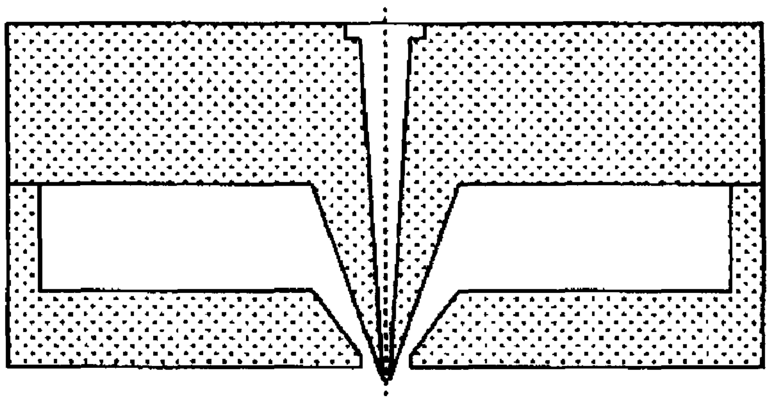
Figure 10C:
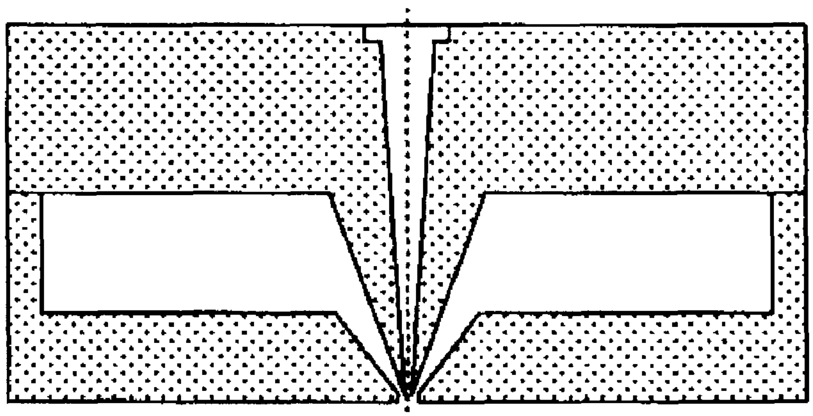

The discharging surface of the nozzle hole and gas nozzle can be preferably controlled up and down as shown in FIGS. 10A to 10C as a production apparatus. FIG. 10A shows a state in which a nozzle hole surface and a slit nozzle surface of the high-pressure gas flow are arranged on the same surface. FIG. 10B shows a positional relation in which the nozzle hole surface is projected beyond the slit nozzle surface of the high-pressure gas flow. FIG. 10C shows the nozzle hole surface arranged inside the slit nozzle surface of the high-pressure gas flow. An adjustment margin between the nozzle hole surface and the slit nozzle surface (vertical adjustment range) is substantially approximately 5D to 10D relative to the opening diameter D of the nozzle. Originally, the positional relation among the nozzle hole, nozzle unit and slit nozzle of the high-pressure gas flow is optimized by the shapes of components according to resin's physical properties. The positional relation can be further optimized by providing the adjustment margin, when the same components are used.

By means of the above-described adjustment, when different raw materials are produced in one apparatus (raw material change), collision state of the extruded material to the high-temperature gas flow is finely adjusted so as to improve the stability of making into the fibrous shape (for example, improvement of continuity of the fibrous toner, less variation in the fiber diameters and the like).

In the present invention, the amount of discharge and flow condition of the extruded material from the nozzle hole are stabilized by controlling the shape of the nozzle hole, and thus more uniform fibrous toner can be obtained.

At first, the direction and amount of flow of the extruded material are stabilized by improving the circularity of the nozzle. The nozzle hole preferably has a circularity of 0.9 or more, and more preferably 0.95 or more.

The straight body part having a length of 5D or more stabilizes discharge amount and the flow direction of the extruded material.

The straight body part preferably has a length of 5D to 12D.

The nozzle preferably has an outlet opening of circle-converted diameter D of 100 μm to 400 μm.

It is known that a kind of pulsation phenomenon, such as melt fracture and spiraling, occurs depending on the balance between rheologic properties and shearing force of the raw material when a fluid is discharged from a hole. The occurrence of these phenomena can be reduced by appropriately controlling accumulation or a slip phenomenon in the vicinity of the nozzle hole. Setting the length of the straight body part to a suitable level effectively reduces the occurrence of the pulsation phenomenon.

The straight body part for the nozzle hole is, for example, as shown in FIG. 7. The nozzle hole tapers toward the nozzle hole outlet, and has the straight body part which has the same shape as the outlet hole.

In case any of the above requirements are not satisfied, when the center distance between the nozzles or nozzle pitch is less than 10D, fibrous toner particles discharged from adjacent nozzles are frequently collided and melted, and cannot be processed to a toner, thereby decreasing yield.

When the pitch is 1.5 mm or more, the flow direction of the fibrous toner is not stable, and the fibrous toner unevenly contacts the high-temperature gas flow, and variation in the fiber diameter in each nozzle becomes larger, thereby decreasing yield.

The nozzle having a circularity of 0.9 or more leads to less variation in the fiber diameters, and improvement of yield.

Moreover, a circularity of 0.9 or more enables to stabilize the flow direction, and the possibility that extruded materials contact each other between adjacent nozzles is decreased. Thus, the nozzle pitch may be 3.3D at minimum, and thereby production capacity and energy efficiency are dramatically improved per an apparatus scale.

Circularity is defined as "circularity=l/L", where "L" represents a circumferential length of a nozzle hole and "l" represents a circumferential length of a circle having the same area as a cross section of the nozzle hole.

Therefore, when the circularity is 1, the nozzle hole is a perfect circle, and the value becomes smaller as the nozzle hole deviates in shape from the perfect circle.

The reason that circularity affects processability is considered as follows: frictional resistance is non-uniform in each part of the circumference of the columnar toner which is extruded in a non-uniform shape, and consequently flow velocity in each minute space of cross section of the columnar toner may be randomly fluctuated, and then a flow direction may be varied; and a melted toner, which is a pseudoplastic fluid, and the columnar toner may get an imbalance of flow velocity and a viscosity in part. Specifically, the discharge direction differs in each nozzle, a condition of contacting with high-temperature gas flow for drawing varies, when circularity varies in each nozzle hole. As a result, the fibrous toner is cut or the thickness of the fibrous toner varies, and thus a large amount of dust is generated. The dust adheres around the nozzle, and the formed state of the fibrous toner may be adversely affected.

Meanwhile, the production capacity of this apparatus is inversely proportional to nozzle pitch and energy consumption is proportional to nozzle pitch.

When the pitch is less than 3.3D and the straight body part has a length of 15D, it caused cracks and damages to the nozzles of the nozzle unit when the taper angle immediately anterior to the nozzle and angle of supplying gas flow fall in the above-described ranges. Thus, the pitch of less than 3.3D is judged that nozzles fail to have a sufficiently-safe hardness as a production apparatus.

The straight body part is required to have a length of a certain ratio and above for the following reasons:

When the length of the straight body part is less than 5D, pulsation amount of flow is large and fiber diameter per nozzle largely varies. This seems to be a resonance by friction with the inner wall of the nozzle.

When the straight body part has a length of 5D or more, the variation in the fiber diameters is within an allowable level. When the straight body part has a length of more than 12D, further improvement effect cannot be recognized.

However, the upper limit is set as 15D. The nozzle hole becomes worn when used for a certain period, and wear progresses from upstream. A margin of approximately 3D may be provided in view of durability of components.

When the amount of extrusion is constant and the melted toner is assumed to behave according to Hagen-Poiseuille law, the extrusion pressure increases in proportion to the length of the straight body part. Thus, an unnecessary margin leads to energy waste, thereby setting the margin to 3D or less.

In the present invention, when the volume (mass) of the high-temperature gas flow is constant, drawing efficiency is improved by increasing the flow rate.

Figure 5A:
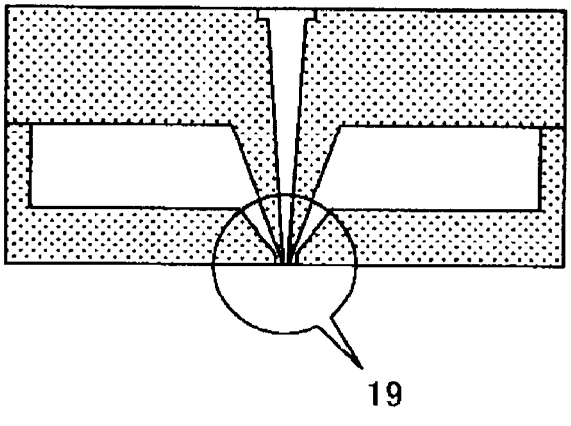
FIGS. 5A to 5C show explanatory views of examples of laval structures.
Figure 5B:
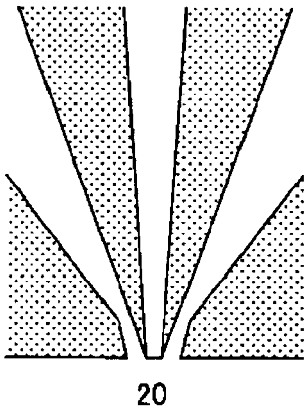
Figure 5C:
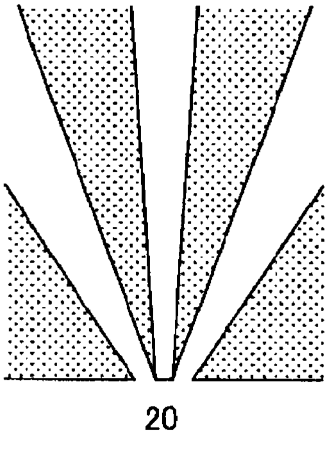

The apparatus of the present invention, as shown in FIGS. 5A to 5C, the laval structure is adopted to the nozzle for high-temperature gas, so that the gas flow rate is increased without increasing the volume (mass) of the high-temperature gas flow, thereby increasing drawing efficiency. FIG. 5A shows an entire nozzle unit containing the high pressure gas nozzle. FIGS. 5B and 5C show enlarged views of vicinities of the tips of the nozzle holes. FIG. 5C shows a known high pressure gas nozzle. FIG. 5B shows a high pressure gas nozzle of the present invention. FIG. 5B has a shape in which a gas nozzle is once tapered and then released, i.e., a laval structure, and is configured to discharge high-pressure gas flow at higher rates. Specifically, the high pressure gas nozzle of the present invention as shown in FIG. 5B can discharge gas flow at higher rates, compared to the known nozzle as shown in FIG. 5C, and exhibits larger drawing effect and the nozzle of the present invention can produce more efficiently thinner fibrous toner in the same utility amount.

The slit part preferably has a clearance of 0.2 mm to 0.8 mm.

The nozzle is finished to have a smooth surface without any defects such as burrs and chips to ensure uniform air flow.

The apparatus of the present invention contains a tournament-form distribution flow path and a static mixing mechanism (static mixer) in the flow path, so that the toner raw materials, which are hard to be kept dispersed and mixed, can be fed to the nozzle without causing separation of ingredients. As the static mixing mechanism, those known in the art can be used.

The apparatus of the present invention can improve a dispersion condition of the raw material in the flow path, so that the thermal history of the raw material through the flow path can be made uniform, and generation of the thermally-degraded substance can be suppressed. Moreover, uniform and homogeneous raw materials can outflow from each nozzle hole. Thus, the temporal variation of the fiber diameters in the same nozzle is suppressed and variation of the fiber diameters of each nozzle hole becomes smaller and a more uniform fibrous toner can be obtained.

In the known method (Japanese Application Laid-Open (JP-A) Nos. 2006-106235 and 2006-106236) in which a static mixer is disposed posterior to an extruder and immediately anterior to a distribution flow path, the dispersion condition may be disrupted for separation and segregation in the distribution flow path, and once-dispersed raw material B, particularly, a wax component cannot be controlled to be reseparated at a desired amount. Specifically, the amount to be processed is needed to be determined as a condition for obtaining a desired internal structure, and the function is not sufficient as a production apparatus. Moreover, it is not economical because a mixing unit should be prepared in a number corresponding to the number of nozzles arranged in a part which directly leads to an entrance of the nozzle hole, or immediately anterior to the outlet. In addition, the segregation in the distribution flow path cannot be prevented and the dispersed raw material B is non-uniformed before distributed to each nozzle, and particularly, cannot keep uniformity at all in case of scale up. Moreover, the pitch between nozzles cannot be smaller than the mixing unit, and cannot be integrated, and production cost is high because each mixing unit is fine.

According to the mixing mechanism of the apparatus of the present invention, the uniformity in each nozzle can be assured without influenced by the amount to processed and processing temperature by distributing a once-homogenized raw material as it is. When the mixing mechanism is not provided, the nozzle may be clogged after a continuous running for a few days, or the pressure increase is caused by clogging of the filter disposed anterior to the nozzle. Thus, the mixing mechanism requires maintenance by necessity. While the mixing mechanism is provided, no errors similar to the above occur even after a continuous running for a month or longer. This is estimated that the raw material is mixed in each part of the flow path, and the temperature thereof in the each part of the flow path is made uniform so as to avoid partial heating, thereby reducing the amount of thermally-degraded substance generated in the flow path.

The division number of the tournament is preferably 1 to 5 steps for the gear pump, and more preferably 1 to 4 steps.

A twisted static mixing mechanism is preferably provided in the tournament-form flow path.

A distribution flow path of tournament form is adopted rather than manifold form, because residence-time distribution of the resin may easily increase in the manifold part, and this is detrimental to an apparatus for processing a toner raw material which is particularly easily thermally-degraded. Since the degradation of the raw material excessively affect toner quality, the tournament form is selected after much trial and error to find a distribution method with less residence-time distribution.

The tournament-form distribution flow path preferably has a fan-shaped final flow path, and a fan-shaped unit has a width of 45 mm to 90 mm.

It is necessary to select a form that produces less residence-time distribution because the toner raw material tends to undergo thermal degradation and significantly affects toner quality. Thus, the fan-shaped unit is employed and the size of one fan-shaped unit is controlled as described above.

When the nozzle unit is longer than the fan-shaped unit, a plurality of fan-shaped units are disposed per nozzle unit. For example, when the nozzle unit has a length of 200 mm, four fan-shaped units having a length of 50 mm are preferably disposed anterior to the nozzle unit.

Figure 6:
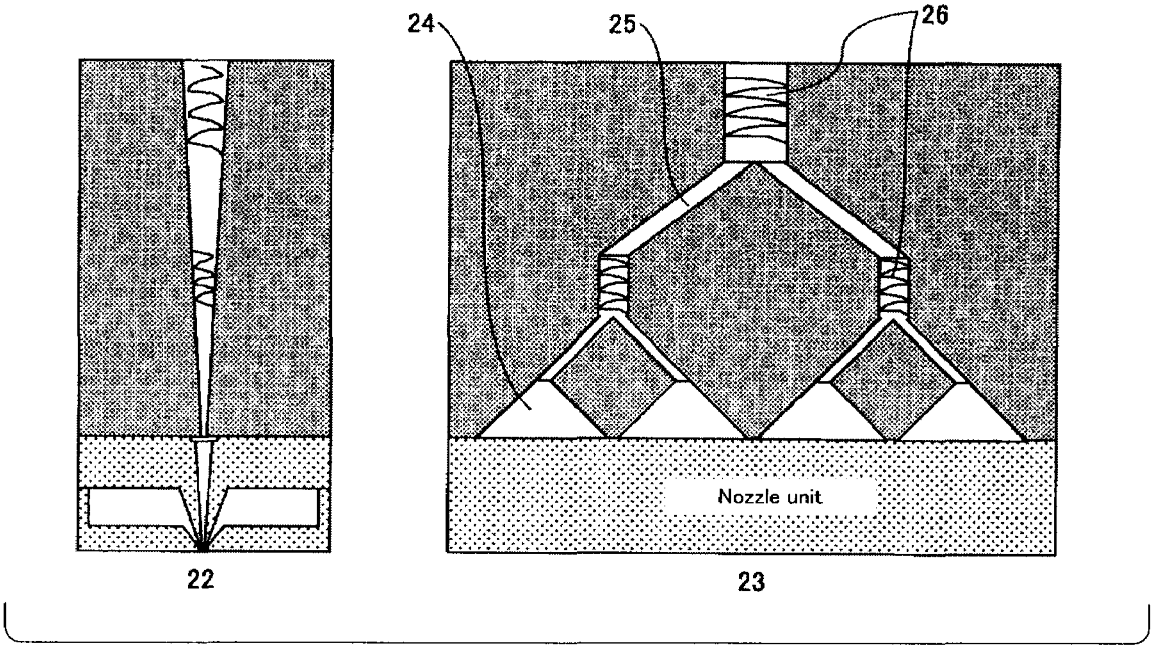
FIG. 6 shows an example of an arrangement of a tournament-form distribution flow path and a static mixer.

The above configuration may be a distribution flow path unit as shown in FIG. 6.

By the production apparatus of the present invention which satisfies the above requirement, a fibrous toner precursor having small variations in the fiber diameters with a coefficient of variation of 23% or less can be efficiently obtained.

The basic preset temperature of the extruder which is an apparatus for melting, kneading and extruding the toner raw material, used in the present invention is preferably in the range of Tg to T½×2 of the toner raw material or a resin constituting the toner raw material. When the toner raw material is used, it is preferably approximately 50° C. to 250° C. more preferably 50° C. to 235° C. and still more preferably 60° to 220° C. However, a part of the extruder may be set at 50° C. or less in terms of controlling the extruder, only when the temperature of the raw material in the extruder is Tg or more.

Figure 11:
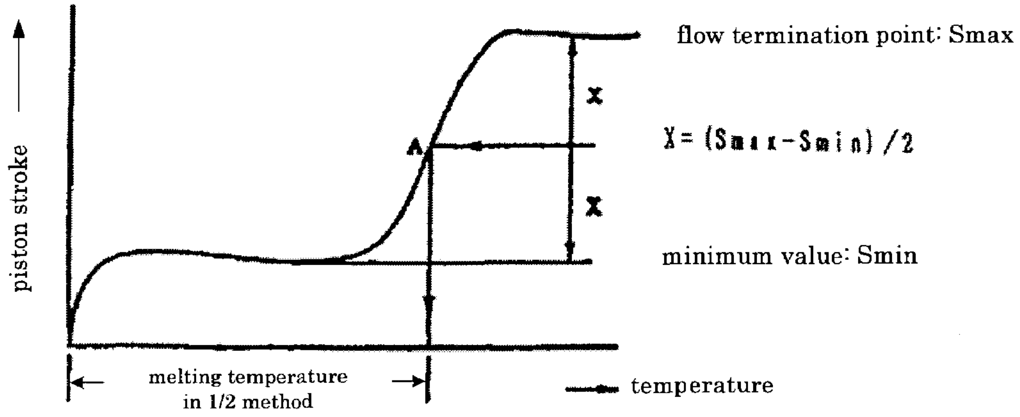
FIG. 11 shows an explanatory diagram of a melting point in the ½ method.

"T½" as used herein means a melting temperature in ½ method, and a measuring method is described hereinafter. For measuring thermal properties of a toner, for example, an elevated flow tester CFT 500 by SHIMADZU CORPORATION is used. The flow curve produced by the flow tester is shown in FIG. 11, from which respective temperatures can be read. In FIG. 11, a melting point in the ½ method is a softening point of the present invention.

<Measurement Condition>

Load: 30 kg/cm$^2$

Rate of temperature increase: 3.0° C./min

Die aperture: 0.50 mm

Die length: 1.0 mm

As used herein, a glass transition point (Tg) in the present invention is specifically determined as follows:

A measurement is carried out using TA-60WS and DSC-60 by SHIMADZU CORPORATION as measuring apparatuses under the following measurement condition:

Measurement Condition

Sample container: aluminum sample pan (with a lid)

Sample amount: 5 mg

Reference: aluminum sample pan (alumina 10 mg)

Ambient atmosphere: nitrogen (flow rate 50 ml/min)

Temperature Condition

Starting temperature: 20° C.

Rate of temperature rise: 10° C./min

Termination temperature: 150° C.

Retention time: None

Rate of temperature fall: 10° C./min

Termination temperature: 20° C.

Retention time: None

Rate of temperature rise: 10° C./min

Termination temperature: 150° C.

A measured result is analyzed using a data analysis software TA-60 version 1.52 by Shimadzu Corporation. For the detailed analyzing method, centering on the maximum peak point in the DrDSC curve which is the DSC derivative curve of the second temperature raise, the maximum peak point ±5° C. is designated as the range to obtain the peak temperature of the sample using the peak analyzing function of the analysis software. Next, the maximum endothermic temperature in the DSC curve of the sample in the range +5° C. to −5° C. is obtained using the peak analyzing function of the analysis software. The temperature indicated by the analysis software corresponds to the melting point (Tg) of the toner.

The temperature from posterior to extruder to immediately anterior to the nozzle unit is based on the temperature of the extruder. However, it may be generally higher than the temperature of the extruder.

The nozzle and the nozzle unit preferably have a temperature of T½ to T½×2. When the toner raw material is used, it is preferably approximately 100° C. to 250° C. more preferably 140° C. to 250° C. and still more preferably 150° to 240° C.

A differential pressure ΔP of anterior and posterior to the gear pump is preferably small in view of constant feed amount. Specifically, ΔP is obtained by subtracting a pressure anterior to a gear pump from a pressure posterior to the gear pump, "ΔP=a pressure posterior to a gear pump−a pressure anterior to the gear pump", it is preferably $-1<\Delta P<9$ MPa, more preferably $-0.5<\Delta P<6$ MPa, and still more preferably $0<\Delta P<2$ MPa.

The pressure posterior to the gear pump is preferably 15 MPa or less, more preferably 10 MPa or less, and still more preferably 9 MPa or less in view of durability.

It is known that toner particles having a sharp particle size distribution are obtained by pulverizing a fibrous toner precursor having less variation in the fiber diameters. The fibrous toner precursor is produced by the method of the present invention which satisfies the above requirements, whereby production efficiency of the fibrous toner precursor can be improved, and yield and particle size distribution obtained by a method for producing toner particles, in which the fibrous toner precursor is cut and pulverized by means of a known method can also be improved.

For the methods for making the fibrous toner precursor into fine particles, the fibrous toner precursor is pulverized by a mechanical pulverizer, a high pressure airflow pulverizer and the like. Examples of the mechanical pulverizers include KRIPTRON by Kawasaki Heavy Industries, Ltd., a turbo mill by TURBO KOGYO CO., LTD. and an inomizer by Hosokawa Micron Corporation. Examples of the high pressure airflow pulverizers include a counter jet mill by Hosokawa Micron Corporation, and an IDS pulverizer by Nippon Pneumatic Mfg. Co., Ltd. For an apparatus for making the fibrous toner precursor into fine particles, particularly, a mechanical pulverizer equipped with a built-in classifier is more preferred.

When coarse pulverization and medium pulverization are provided before fine pulverization, pulverizers such as cutter, knife, pin-type pulverizers and other common pulverizer may be used. Additionally, the above pulverizers combined with a screen and/or a wind force classifier and the like can be used. In coarse pulverization and medium pulverization, it is only required that the fibrous toner precursor be cut to a level that can ensure smooth feeding of cut fibrous toner precursor into a fine pulverizer; it is only required that the fibrous toner precursor be cut to pieces of approximately several centimeters to several millimeters.

Figure 12:
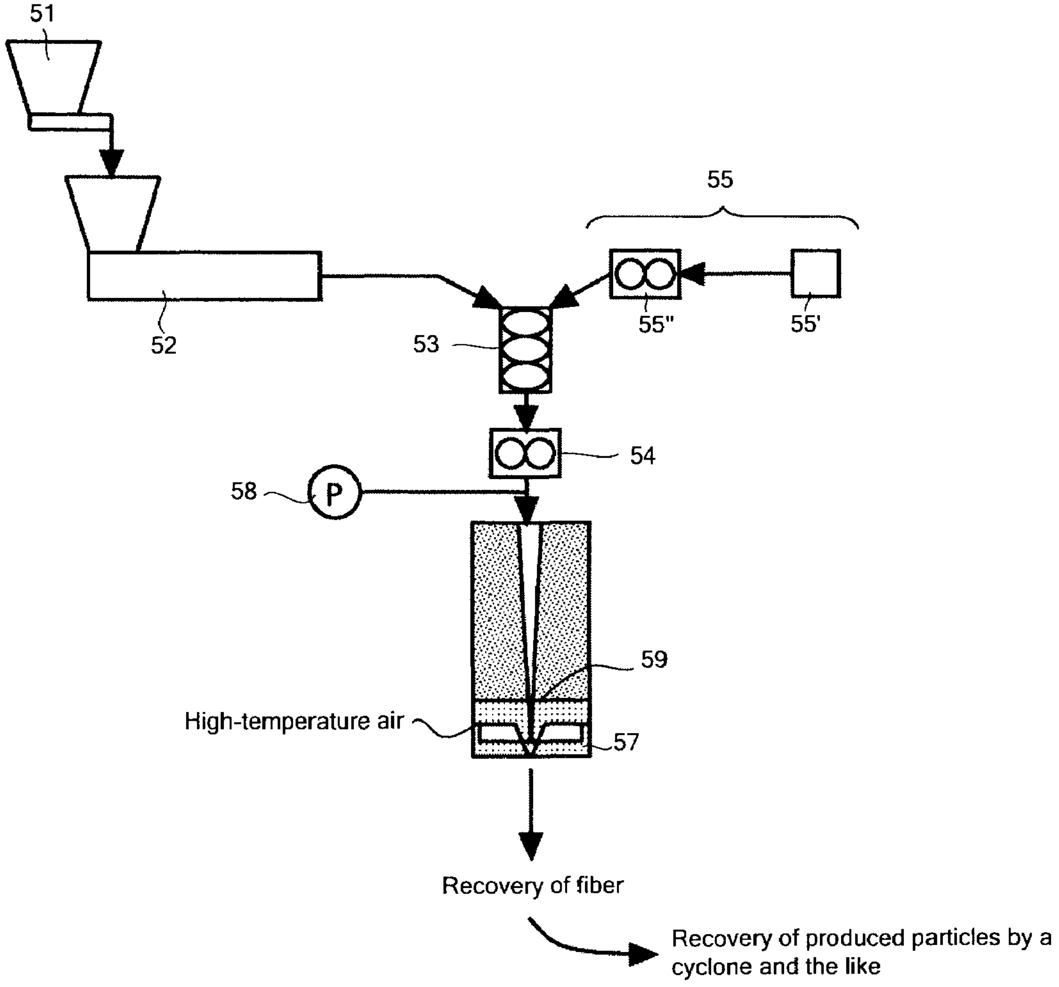
FIG. 12 shows a schematic view of an example of an entire apparatus for producing a fibrous fine particle precursor.

FIG. 12 shows a schematic view of an example of an entire apparatus for producing a fibrous fine resin particle precursor. A supplying unit for a gaseous substance is provided in a known apparatus for producing fine resin particle precursor (a spinning apparatus).

The fibrous precursor has air gaps inside and thus hardness in each part of the fibrous precursor varies at a micro level; therefore the fiber tend to undergo breakage (the same effect brought about by air bubbles and pulverizing aids disclosed in JP-A 2005-004182). Thus, fine particulation of fibrous fine resin particle precursor, for example, by means of pulverization and cut (hereinafter collectively referred to as "pulverization") becomes easy, and production capacity is improved and process energy is decreased. Specifically, in a technical field in which the fibrous fine resin particle precursor is pulverized to obtain particles having a uniform particle size distribution, further efficiency is promoted.

Any known method may be used for the method for producing the fibrous precursor. For example, by melt spinning, a resin is extruded from a pipe sleeve and may be drawn by pulling and winding using a roller, or may be drawn by high-temperature air for spunbonding and melt blowing. A dry spinning using a solvent, and a wet spinning using a reaction solution may be used depending on the resin system. The method for making into a fiber shape is not particularly limited.

In case of the melt spinning, a temperature of a heating machine and kneading machine during heating and melting is preferably set at Tg or more of the resin to Tg×4 or less of the resin, more preferably at Tg×1.5 or more to Tg×3 or less of the resin. Examples of the heating machines and kneading machines include those commonly used, so-called an extruder, kneader, heating pot, but not limited thereto.

The size (thickness) of the air gaps inside the fibrous fine resin particle precursor (hereinafter also referred to as fiber) is preferably not over one-third as thick as fiber diameter, and more preferably not over one-fourth as thick as fiber diameter. Many of the air gaps have shapes extended along the long axis direction of the fiber by necessity due to the drawing effect. The thickness of the air gap is obtained from the diameter of the cross section of an air gap cut along a plane vertical to the long axis direction of the fiber. The porosity, which substantially corresponds to an area ratio of air gaps over a cross section of a fiber, is 10% to 55%, preferably 13% to 50% and more preferably 15% to 40%. Too large porosity results in easy breakage of fiber structures in its thickness direction when the fiber is made into fine particles, generating a large amount of fine powder.

Here, an evaluation method for the size (thickness) of the air gaps inside the fiber will be explained.

In the present invention, the fiber diameter is defined as the diameter measured at the narrowest point across a fiber piece section, and the thickness of an air gap is defined as the diameter of a section of an air gap located at the same place as the fiber piece section. Specifically, a toner is embedded in an epoxy resin and then sliced in an ultrathin section of 100 μm in thickness. The ultrathin section is dyed with ruthenium tetroxide, and then the cross-section of the toner is observed using a transmission electron microscope (TEM) at a magnification of 10,000 and SEM pictures of the toner are taken. The thickness of the air gap relative to the fiber diameter is measured by evaluating each of 20 SEM pictures (20 toner particles).

Figure 13A:
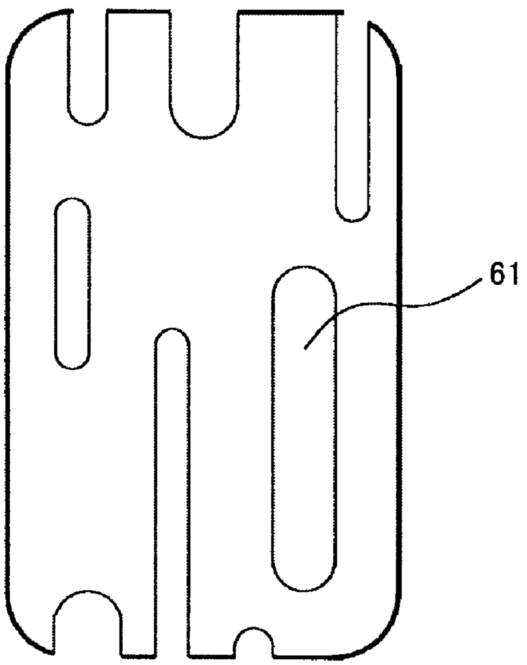
FIGS. 13A and 13B show cross sectional views of examples of an internal structure in a long axis direction and a short axis direction of a fibrous fine particle precursor, respectively.
Figure 13B:
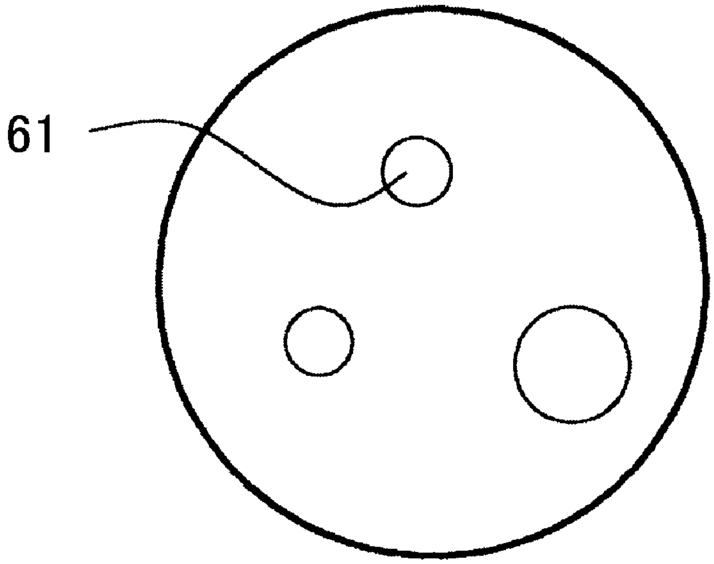

FIG. 13A shows a cross sectional view of an internal structure in a long axis direction of the fibrous fine resin particle precursor, and FIG. 13B shows a cross sectional view of an internal structure in a short axis direction of the fibrous fine resin particle precursor.

The fibrous fine resin particle precursor having therein air gaps 61 can be obtained by mixing gas with a resin before the fibrous fine resin particle precursor made into a fiber shape.

Particularly, when the gas is dissolved in the resin, more uniform air gaps can be formed. And then, each part of the fibrous fine resin particle precursor becomes macro-uniform so as to suppress broad particle size distribution and generation of the fibrous fine resin particle precursor having a part which is difficultly pulverized. Examples of gas include nitrogen, carbon dioxide and butane gases which are generally highly soluble to resins and easily form uniform air bubbles. Among these, nitrogen and carbon dioxide gases are more preferable.

Meanwhile, the apparent viscosity of a mixture containing the gas and resin decreases by mixing of gas in the resin, and thus extrusion energy from a pipe sleeve is decreased when the fibrous fine resin particle precursor is made into a fiber shape. Additionally, the mixture of the gas can decrease the heating temperature when extruding, and may effect to prevent degradation of the resin.

The gas dissolved in the resin is more preferred because the viscosity of the resin is further decreased, and heating temperature can be decreased.

As a method for mixing the gas, any method known in the art can be used. An extruder, static mixer or the like may be used for mixing. Any known appropriate apparatus can be used.

The mixing ratio of the gas may be set according to a desired porosity. In view of the easiness with which fibrous shape is obtained, the porosity is preferably 10% to 50%, more preferably 13% to 45%, and still more preferably 15% to 40%. A gas having a volume corresponding to the porosity may be supplied in order to achieve that porosity. Specifically, a larger amount of gas is fed to obtain larger porosity, and a small amount of gas is fed to obtain a small porosity.

The volume of the gas changes depending on temperature and pressure, but a value obtained in the standard state can be used on production technology. Specifically, when air is used, the volume of air gaps and porosity are found from the air volume when it is assumed that air has an average molar mass of 29 g/mol, a volume of 22.4 L in the standard state, i.e., density of 1.29 kg/m$^3$. In the same way, for example, the volume of air gaps and porosity are found using the average molar mass of carbon dioxide (40 g/mol), or average molar mass of nitrogen (28 g/mol).

The specific gravity of basic components of the toner, specifically, a resin, pigment, charge controlling agent and wax may vary in a range from 1,000 kg/m$^3$ to 1,300 kg/m$^3$ depending on their formulations. Technically, a specific gravity of 1,150 kg/m$^3$ is sufficient.

The size (thickness) of the air gap can be controlled mainly by changing a mixing condition. For example, when finer air bubbles are formed, larger mixing force (kneading) is given after the gas is supplied, and the number of the elements of mixer may be increased to obtain finer air bubbles by using the static mixer.

However, when the fiber has a large porosity such as 35% to 50%, the air bubbles may be united in a mixing process, even after the air bubbles are finely dispersed. In this case, a gas highly soluble to the resin is selected to suppress reunion of the air bubbles in the mixing process; for example, butane and carbon dioxide gases can be suitably used. Additionally, a gas in the supercritical state may be used in terms of high solubility. Examples thereof include carbon dioxide and nitrogen gases in the supercritical state.

It is useful to use a gas having high solubility and a gas in the supercritical state, even when the porosity is small, for the purpose of more uniformly dispersing air bubbles.

A porosity of more than 60% causes fine cracks when the fibrous fine resin particle precursor is made into fine particles, and particle size distribution after fine particulation becomes broad. When the porosity is too small, easiness of fine particulation cannot be improved.

The gas becomes easily dissolved in the resin by mixing it in a supercritical state, and air gaps are more uniformly formed. Moreover, the resin and the gas are uniformly mixed when the gas is mixed in a supercritical state and then made into a fiber shape, and the fiber diameters easily becomes uniform when made into a fiber shape, as compared to a case where the gas is not in the supercritical state. As a result of the above two effects, more uniform fine resin particles can be easily obtained.

As a method for mixing the gas in the supercritical state, those known methods can be used. An extruder, static mixer or the like may be used for mixing. The methods for mixing are not limited but a known static mixer is preferably used by means of a melt spinning.

The size (thickness) of the air gap can be controlled mainly by changing a mixing condition. For example, when finer air bubbles are formed, larger mixing force (kneading) is given after the gas is supplied, and the number of the elements of mixer may be increased to obtain finer air bubbles by using the static mixer. However, when the fiber has a large porosity such as 35% to 50%, the air bubbles may be united in a mixing process, even after the air bubbles are finely dispersed. In this case, a gas highly soluble to the resin is selected to suppress reunion of the air bubbles in the mixing process; for example, butane and carbon dioxide gases can be suitably used. Additionally, a gas in the supercritical state may be used in terms of high solubility. Examples thereof include carbon dioxide and nitrogen gases in the supercritical state. It is useful to use a gas having high solubility and a gas in the supercritical state, even when the porosity is small, for the purpose of more uniformly dispersing air bubbles.

The thus produced fibrous fine resin particle precursor is extremely excellent to obtain uniform fine particles and able to apply to an electrophotographic toner. The toner is needed to have a uniform particle size distribution. The amount of resin per particle can be decreased when the particle diameter by appearance is such that the volume average particle diameter (D50) is 4 μm to 8 μm within which high handling ability is obtained. Thus, the thickness of a toner layer in each dot can be thin compared to toner particles having the same particle diameter. Therefore, particularly a color toner taking advantage of the fibrous fine resin particle precursor can form an image excellent in quality.

In conventional toner particles, a minimum amount of toner attached per color of a color toner needs at least one layer based on toner particle. Generally, an image consists of about two layers of toner particles, and a four-color image consists of about 8 layers. A toner having a particle size of 8 μm is used, an fixed image having a thickness of about 60 μm.

The particles used in the present invention have the following relationship:

$$T=(1-y)t$$

where "y" is the porosity inside, "T" is the thickness of a toner layer, and "t" is the thickness formed by a conventional toner having the same particle diameter.

According to this feature, thickness variations over a fixed color image can be reduced, and discomfort to the image can be removed.

Moreover, this is effective in terms of toner consumption. For example, when the minimum amount of toner attached is a layer which is densely supplied, toner consumption is represented by the following linear Expression (1) with respect to toner particle diameter:

$$\text{Consumption } M=(\tfrac{1}{3}\times\sqrt{3})\times\pi(1-y)\rho D \qquad \text{Expression (1)}$$

where "ρ" is a true specific gravity of toner, and "D" is a toner particle diameter.

Therefore, the toner consumption can be decreased by increasing the porosity of the toner, when particle size is reduced or is constant.

Additionally, the toner particles lend themselves well to health issues. Recent years, the likelihood of fine particles deposition in the respiratory organ has become controversial, and it is said that the limit particle size (lower limit of particle size) of dry toner particles, above which human can handle with safety, is 3 μm to 4 μm. However, the porosity of the particles is made larger so that the lower limit can be substantially decreased because the deposition in the respiratory organ depends on aerodynamic diameter. Specifically, the toner will possibly have a smaller diameter and accordingly improve image quality in future.

EXAMPLES

Hereinafter, the present invention will be explained with specific Examples.

However, these are only one aspect of the invention, and should not be construed as limiting the scope of the invention. In Examples and Comparative Examples, all part(s) and percentage (%) are expressed by mass-basis unless indicated otherwise.

Comparative Example A-1

Polyester resin as a raw material B: 46.75 parts, softening point 107° C., Tg 64° C.
Polyester resin as a raw material A: 38.25 parts, softening point 124° C., Tg 64° C.
Polyester resin as the raw material A: 10.00 parts, softening point 112° C., Tg 58° C.
Magenta pigment as the raw material A: TOSHIKI RED 1022 by Dainippon Ink and Chemicals Incorporated, 6.00 parts
Carnauba wax as the raw material B: 9.00 parts
Rice wax as the raw material B: 6.00 parts
Polarity controlling agent as the raw material A: BONTRON E-304 by Orient Chemical Industries, Ltd., 0.50 parts These were pre-mixed by a Henschel mixer, and processed according to the procedure described below and a flow as shown in FIG. 1.

(Arrangement of Nozzle Holes)

In case that a surface vertical to a flow of an extruded material from the nozzle is located at the shortest distance between the center of opening surface of the nozzle hole and the nozzle hole surface of a gas nozzle of 1.05D, nozzle holes having circle-converted diameter of 190 μm were aligned on the center line of a surface having a width of 0.4 mm.

In this Example, a small unit, in which 50 nozzle holes were aligned at a center distance (pitch) of 0.9 mm intervals was used. The arrangement of the nozzle holes was as shown in FIG. 2.

(Feed of raw Material)

A mixture was melted and kneaded by an extruder, and further extruded and fed in a melted state (150° C.) to the next step.

(Distribution of Raw Material)

The melt material was passed through a static mixer kept at 190° C. and was extruded from nozzle holes formed on an extrusion nozzle unit, while the volume flow rate was adjusted at 0.14 cc/min in each nozzle hole by a gear pump. In Comparative Example A-1, a small unit was used, and therefore the raw material was distributed to each nozzle with a single step by means of a fan-shaped distribution flow path. A structure as shown in FIG. 6 was adopted as the fan-shaped distribution flow path 24.

(Temperatures of High-temperature Gas Flow and Each Unit)

The extruded material was drawn from the gas nozzle by a hot air at 220° C. as a high-temperature gas flow for drawing, to obtain a fibrous fine particle precursor. Each unit posterior to the static mixer was kept at 220° C.

(Amount of High-temperature Gas)

A high-temperature gas (air) was supplied at 1.3 m3/s (at 25° C. under 1 atmospheric pressure) per 1 mm of the nozzle unit.

(Gas Nozzle for High-temperature Gas)

The gas nozzle was a nozzle having 0.5 mm slit-like two lines running in parallel across tandemly-arranged nozzle holes as shown in FIGS. 2 and 3A to 3B.

(Evaluation)

250 fibers were sampled about 1 hour after start of operation, and each thickness thereof was measured using an optical microscope. Specifically, the fibers extruded from the 50 nozzle holes were sampled from each nozzle 5 times: 50 min., 55 min., 60 min., 65 min. and 70 min. after running was started. The thickness of the sampled fiber was measured at any part to obtain a fiber size distribution including variation in each nozzle and variation in each nozzle at each time of sampling. An average fiber diameter and standard deviation were obtained from the fiber size distribution, and a coefficient of variation was further obtained. The finer average fiber diameter a fiber had, the more efficiently it was drawn, and the smaller coefficient of variation a fiber had, the more uniformly it was formed.

The conditions of the fibers 8 hours after start of operation were visually observed and evaluated as follows: "continuous": the fiber was continued by visual observation; "slightly discontinuous": the fiber was slightly broken and dust was generated; and "discontinuous": the fiber was obviously broken at many positions and hardly considered as a continuous fiber.

Evaluation Condition
Angle of supplying gas flow
Taper angle immediately anterior to a nozzle
Vertical surface
Nozzle circularity
Length of straight body part
Laval structure
Twisted mixing structure of distribution flow path The above-described apparatus and evaluation condition were defined as "Standard Condition A" and other apparatus conditions and the like are shown in Table 1.

The evaluation results of the obtained fibrous toner precursors (hereinafter also referred to as fiber) are shown in Table 2.

TABLE 1

| | Supply of gas flow | Taper angle immediately anterior to nozzle | Vertical surface | Length of straight body part | Nozzle circularity | Laval structure |
|---|---|---|---|---|---|---|
| Reference Condition 1 | 40 | 4 | 0.2 D | 3 D | 0.86 | Not adopted |
| Reference Condition 2 | 12 | 4 | 0.2 D | 3 D | 0.86 | Not adopted |

TABLE 1-continued

| | Supply of gas flow | Taper angle immediately anterior to nozzle | Vertical surface | Length of straight body part | Nozzle circularity | Laval structure |
|---|---|---|---|---|---|---|
| Comparative Condition 5 | 22 | 4 | 0.2 D | 3 D | 0.86 | Not adopted |
| Comparative Condition 6 | 22 | 4 | 4 D | 3 D | 0.86 | Not adopted |
| Comparative Condition 3 | 22 | 18 | 0.2 D | 3 D | 0.86 | Not adopted |
| Comparative Condition 4 | 12 | 4 | 4 D | 3 D | 0.86 | Not adopted |
| Comparative Condition 7 | 22 | 4 | 4 D | 10 D | 0.99 | Not adopted |
| Comparative Condition 8 | 22 | 4 | 0.4 D | 3 D | 0.86 | Not adopted |
| Comparative Condition 9 | 22 | 4 | 3.5 D | 10 D | 0.99 | Not adopted |

TABLE 2

| | Condition of fiber (After 1 hour) | Average fiber diameter (After 1 hour) | Standard deviation (After 1 hour) | Coefficient of variation (After 1 hour) | Remarks (After 1 hour) | Condition of fiber (After 16 hour) |
|---|---|---|---|---|---|---|
| Reference Condition 1 | discontinuous | | | | Large amount of short fibrous shapes. | discontinuous |
| Reference Condition 2 | slightly discontinuous | 7.91 | 1.52 | 19.22 | Large amount of adhesion around the nozzle. | slightly discontinuous |
| Comparative Condition 5 | slightly discontinuous | 6.98 | 1.21 | 17.34 | Pulsation of fiber diameter. Large amount of adhesion around the nozzle. | slightly discontinuous |
| Comparative Condition 6 | slightly discontinuous | 7.43 | 1.69 | 22.75 | Pulsation of fiber diameter. Large amount of adhesion around the nozzle. | discontinuous |
| Comparative Condition 3 | slightly discontinuous | 7.33 | 1.75 | 23.87 | Significant pulsation of fiber diameter. Large amount of adhesion around the nozzle. | discontinuous |
| Comparative Condition 4 | slightly discontinuous | 7.83 | 2.1 | 26.82 | Considerable pulsation of fiber diameter. Large amount of adhesion around the nozzle. | discontinuous |
| Comparative Condition 7 | slightly discontinuous | 7.36 | 1.65 | 22.42 | Slight pulsation of fiber diameter. Large amount of adhesion around the nozzle. | slightly discontinuous |
| Comparative Condition 8 | slightly discontinuous | 6.98 | 1.21 | 17.34 | Pulsation of fiber diameter. Large amount of adhesion around the nozzle. | slightly discontinuous |
| Comparative Condition 9 | slightly discontinuous | 7.36 | 1.65 | 22.42 | Slight pulsation of fiber diameter. Large amount of adhesion around the nozzle. | slightly discontinuous |

With the apparatus conditions in Comparative Conditions 3 to 9, a fiber having an average diameter of less than 8 μm could be produced. However, the condition of the fiber was discontinuous or slightly discontinuous, and fiber dust which might be generated during cutting and breaking the fiber adhered around the nozzle, and then stability was likely to be reduced particularly after long run (16 hours later). It was evaluated that large amount of adhesion around the nozzle caused disturbance of air current in a vicinity of the nozzle and a condition of production of the fiber after long run became worse.

In Comparative Conditions 3 to 9, the pulsations of the fiber diameters were significant and the entire fibers produced from the same nozzle hole were scanned to be observed by a microscope, and found the pulsation of the fiber diameter which was easy-noticeable by visual observation.

Example A-1

Examples in which improvement was added on the basis of the present invention in “Standard Condition A” described in Comparative Example A-1 will be illustrated hereinafter.

The apparatus condition and the like other than “Standard Condition A” are shown in Table 3. The evaluation results of the obtained fibrous toners are shown in Table 4.

TABLE 3

| | Supply of gas flow | Taper angle immediately anterior to nozzle | Vertical surface | Length of straight body part | Nozzle circularity | Laval structure |
|---|---|---|---|---|---|---|
| Implementation Condition 3 | 22 | 4 | 1.05 D | 3 D | 0.86 | Not adopted |
| Implementation Condition 4 | 22 | 4 | 1.05 D | 10 D | 0.86 | Not adopted |
| Implementation Condition 5 | 22 | 4 | 1.05 D | 10 D | 0.99 | Not adopted |
| Implementation Condition 7 | 22 | 4 | 1.05 D | 10 D | 0.99 | Adopted |
| Implementation Condition 9 | 22 | 4 | 0.6 D | 3 D | 0.86 | Not adopted |
| Implementation Condition 10 | 22 | 4 | 3.5 D | 3 D | 0.86 | Not adopted |
| Implementation Condition 11 | 22 | 4 | 1.05 D | 4.5 D | 0.86 | Not adopted |
| Implementation Condition 12 | 22 | 4 | 1.05 D | 5.5 D | 0.86 | Not adopted |
| Implementation Condition 13 | 22 | 4 | 1.05 D | 10 D | 0.88 | Not adopted |
| Implementation Condition 14 | 22 | 4 | 1.05 D | 10 D | 0.91 | Not adopted |

TABLE 4

| | Condition of fiber (After 1 hour) | Average fiber diameter (After 1 hour) | Standard deviation (After 1 hour) | Coefficient of variation (After 1 hour) | Remarks (After 1 hour) | Condition of fiber (After 16 hour) |
|---|---|---|---|---|---|---|
| Implementation Condition 3 | continuous | 6.78 | 1.05 | 15.49 | Slight pulsation of fiber diameter. Large amount of adhesion around the nozzle. | slightly discontinuous |
| Implementation Condition 4 | continuous | 6.74 | 0.82 | 12.17 | Slightly large amount of adhesion around the nozzle. | slightly discontinuous |
| Implementation Condition 5 | continuous | 6.02 | 0.52 | 8.64 | Small amount of adhesion around the nozzle. | continuous |
| Implementation Condition 7 | continuous | 4.87 | 0.44 | 9.03 | Small amount of adhesion around the nozzle. | continuous |
| Implementation Condition 9 | continuous | 6.61 | 1.04 | 15.73 | Slight pulsation of fiber diameter. Large amount of adhesion around the nozzle. | slightly discontinuous |
| Implementation Condition 10 | continuous | 6.78 | 1.08 | 15.93 | Slight pulsation of fiber diameter. Large amount of adhesion around the nozzle. | slightly discontinuous |
| Implementation Condition 11 | continuous | 6.78 | 1.02 | 15.04 | Slight pulsation of fiber diameter. Large amount of adhesion around the nozzle. | slightly discontinuous |
| Implementation Condition 12 | continuous | 6.74 | 0.84 | 12.46 | Slightly large amount of adhesion around the nozzle. | slightly discontinuous |
| Implementation Condition 13 | continuous | 6.74 | 0.8 | 11.87 | Slightly large amount of adhesion around the nozzle. | slightly discontinuous |
| Implementation Condition 14 | continuous | 6.02 | 0.54 | 8.97 | Small amount of adhesion around the nozzle. | continuous |

Implementation Conditions 3, 9 and 10 are improvements on Comparative Conditions 5, 6, 8 and 9. The condition of the fiber was slightly discontinuous, but improved compared to Comparative Conditions. Moreover, the pulsation of the fiber diameter was at a level that was barely visually observed with a microscope. The improvement of the condition of the fiber was clear from a decreased coefficient of variation in spite of a reduced fiber diameter. The fiber diameter was reduced although the same amount of the high-temperature gas flow was used. This indicated improvement of energy efficiency.

Therefore, the characteristic structure of the nozzle outlet part of the present invention (an area of vertical surface) was satisfied, so that the fibrous toner precursor having narrow fiber size distribution could be obtained more efficiently than conventional methods.

Implementation Conditions 4 and 12 are improvements on Implementation Condition 3. The reduction of the fiber diameter and coefficient of variation were also observed. Additionally, the pulsation of the fiber diameter was reduced. Implementation Conditions 4 and 12 satisfied the condition of the length of the straight body part of the nozzle which was one of the characteristic structures of the present invention, and showed improvement over Implementation Condition 3, for example, the coefficient of variation of the fiber diameter became small. In comparison of Implementation Condition 12 with Implementation Condition 11, the variation in the fiber diameters, specifically, the coefficient of variation was remarkably improved, because the length of the straight body part was approximately more than 5D.

Implementation Condition 5 and 14 satisfied the condition of the nozzle circularity in the apparatus of the present invention, and are improvement on Implementation Condition 4. The condition of circularity of the present invention was satisfied, so that the adhesion around the nozzle was reduced and uniform fiber could be produced more efficiently. In comparison of Implementation Condition 14 with Implementation Condition 13, the variation in the fiber diameters, specifically, the coefficient of variation was remarkably improved, because the circularity was approximately more than 0.9.

With these improvements, the fiber diameter was reduced and energy efficiency was improved. In the embodiment of the present invention, the fiber was drawn by subjecting the entire fiber from the nozzle outlet to downstream to pulling by air current. The amount of the fiber which enjoyed the benefits of pulling by air current due to improvement on continuity of the fiber, and energy efficiency might be improved.

At the same time, adhesion around the nozzle was reduced, because generation of dust was suppressed by reducing the number of fiber breakages.

Implementation Condition 7 was an improvement by adopting a laval structure relative to Implementation Condition 5. The fiber diameter was significantly reduced. Considering that the fiber diameter was significantly reduced, it was evaluated that increase in the coefficient of variation was within the acceptable error range, and the energy efficiency was significantly improved.

Comparative Example A-2

(Alignment of Nozzle Hole)

Circular nozzles having a diameter of 190 μm were aligned on the center line of a surface having a width of 0.4 mm.

In Comparative Example A-2, a unit, in which 501 nozzle holes were aligned at a center distance (pitch) of 0.9 mm intervals was used. The state of the alignment is shown in FIG. 2.

(Feed of Raw Material)

The melted material was continuously passed through a static mixers kept at 190° C. was extruded from the nozzle holes formed on an extrusion nozzle unit, while the volume flow rate was adjusted at 0.14 cc/min in each nozzle hole by a gear pump. In Comparative Example A-2, the raw material was coarsely distributed by means of a tournament-form distribution flow path having 3 steps and distributed to each nozzle through a step of a fan-shaped distribution flow path. A structure denoted by 25 in FIG. 6 was adopted as these distribution flow path. In FIG. 6, 25 denotes a distribution flow path having 2 steps.

(Distribution of Raw Material)

The same condition as Standard Condition A was used.

(Temperature of High-temperature Gas Flow and each Unit)

The same condition as Standard Condition A was used.

(High-temperature Gas)

The same condition as Standard Condition A was used.

(Gas Nozzle for High-temperature Gas)

The same condition as Standard Condition A.

(Other Apparatus Conditions)

Angle of supplying high-temperature gas flow: 22°
Taper angle immediately anterior to a nozzle: 4°
Length of straight body part of a nozzle hole: 10D
Nozzle circularity: 0.99
Laval structure
Structure corresponding to Implementation Condition 7 in Example A-1

Evaluation 2,500 fibers were sampled about 1 hour after running was started, and each thickness thereof was measured by an optical microscope. Specifically, the fiber were extruded from 500 nozzle holes were sampled from each nozzle 5 times, 50 min., 55 min., 60 min., 65 min. and 70 min. after running was started. A thickness of the sampled fiber was measured at any part to obtain a fiber size distribution including variation in each nozzle and variation in each nozzle at each time of sampling. An average fiber diameter and standard deviation were obtained from the fiber size distribution, and a coefficient of variation was further obtained. The finer average fiber diameter a fiber had, the more efficiently it was drawn, and the smaller coefficient of variation a fiber had, the more uniformly it was formed.

A condition of the fiber after the running was started, and that after 8 hours were visually observed and evaluated as follows: "continuous": the fiber was continued by visual observation; "slightly discontinuous": the fiber was slightly broken and dust was generated; and "discontinuous": the fiber was obviously broken in many parts and hardly considered as a continuous fiber.

The above-described apparatus and evaluation condition were defined as "Standard Condition B" and other apparatus conditions and the like are shown in Table 5.

"Standard Condition B" is 10 times the condition of Implementation Condition 7 in terms of scale, under which uniform fibers were most efficiently produced in Example A-1. The evaluation result of the obtained fibrous toner is shown in Table 6.

TABLE 5

| | Twisted mixing structure of distribution flow path |
|---|---|
| Implementation Condition 15 | Not adopted |

TABLE 6

| | Condition of fiber (After 1 hour) | Average fiber diameter (After 1 hour) | Standard deviation (After 1 hour) | Coefficient of variation (After 1 hour) | Remarks (After 1 hour) |
|---|---|---|---|---|---|
| Implementation Condition 15 | slightly discontinuous | 5.29 | 0.84 | 15.88 | Nonuniform discharge amount in nozzles. Wax component was separated and sprayed from a part of the nozzles. |

In Implementation Condition 15, non-uniform discharge amount was observed in nozzles. Specifically, the wax component in the raw material was separated and sprayed from certain nozzles continuously, or in some cases intermittently. This non-uniformity was observed in each fan-shaped unit, or in each distribution flow path of the tournament form.

Example A-2

Example in which improvement was added on the basis of the present invention in "Standard Condition B" described in Comparative Example A-2 will be illustrated hereinafter.

The apparatus condition and the like other than "Standard Condition B" are shown in Table 7. The evaluation results of the obtained fibrous toner are shown in Table 8.

TABLE 7

| | Twisted mixing structure of distribution flow path |
|---|---|
| Implementation Condition 8 | Adopted |

TABLE 8

| | Condition of fiber (After 1 hour) | Average fiber diameter (After 1 hour) | Standard deviation (After 1 hour) | Coefficient of variation (After 1 hour) | Remarks (After 1hour) |
|---|---|---|---|---|---|
| Implementation Condition 8 | continuous | 4.85 | 0.45 | 9.28 | Small amount of adhesion around the nozzle. |

A twisted mixing structure of distribution flow path was denoted by 26 in FIG. 6, and a mixing mechanism is disposed anterior to each branch in Example A-2.

In Implementation Condition 8, discharge non-uniformity and wax separation as observed in Implementation Condition 15 were not observed, and fibrous toner comparable to that of Implementation Condition 7 could be produced even after scaled up.

Example A-3

The fibrous toner precursor obtained in Implementation Condition 8 was cut to short fibrous toner precursors of several millimeters by using a cutter mill such as NIBRA and ROATPLEX (both by Hosokawa Micron Corporation), and then finely pulverized by a mechanical pulverizer equipped with a built-in classifier such as ACM pulverizer or inomizer (both by Hosokawa Micron Corporation) to obtain columnar toner particles having a sharp particle size distribution with the physical properties: volume average diameter=6.4 μm; the proportion of particles having a diameter of 12 μm or more=0 mass % by volume; and the proportion of particles having a diameter of less than 5 μm=4.4% or less by number. The toner particles had a sharper particle size distribution than that described in JP-A 2006-106236, and thus effect of improvement was sufficiently confirmed.

The first embodiment of the present invention can be applied to resin filler materials such as a powder coating and liquid crystal, and a toner for an electronic paper, and other resin particles.

Preferable Examples of the first embodiment of the present invention have been described in detail, but the present invention will not be limited in scope to specified embodiments, and can be variously modified and changed within the scope of the invention.

Hereinafter, the second embodiment of the present invention will be explained with specific examples. These are only one embodiment of the present invention, and the technical scope of the invention is not limited thereto.

First, raw materials will be explained.

(Raw Material)

Polyester resin (1): 46.75 parts, softening point 107° C., Tg 64° C.

Polyester resin (2): 38.25 parts, softening point 124° C., Tg 64° C.

Polyester resin (3): 10.00 parts, softening point 112° C., Tg 58° C.

Magenta pigment: TOSHIKI RED 1022 by Dainippon Ink and Chemicals Incorporated, 6.00 parts Carnauba wax: 3.00 parts Rice wax: 2.00 parts Polarity controlling agent: BONTRON E-304 by Orient Chemical Industries, Ltd., 0.50 parts These were pre-mixed by a Henschel mixer, followed by production of a fibrous fine particle precursor.

Next, common part of spinning and pulverization condition through Examples and Comparative Examples will be explained.

(Spinning Apparatus)

In FIG. 12, melt blowing, which is a kind of a melt spinning method, was used as a spinning method. As shown in FIG. 12, a spinning apparatus contains as main components an extruder 52, a gear pump 54, a static mixer 53, a gas supplying unit 55 containing a gas supplying source 55' such as tank or cylinder and a pump 55", a nozzle unit containing a spinning die and air nozzle for drawing 57, a pressure gage 58 and a raw material screw feeder 51, which are all known components. A gas was supplied from a static mixer part for mixing. A pressure resistance 59 was provided in case of supercritical state.

(Spinning Nozzle)

A nozzle unit having an overall length of approximately 500 m, a nozzle hole diameter of 180 μm, the number of nozzle holes of 501, and a center distance between the nozzle holes (pitch) of approximately 0.9 mm was used.

(Temperature Setting)

The temperature from the extruder to the gear pump was set at 150° C. and the temperature of a spinning pack and spinning nozzle unit was set at 200° C. or 220° C. and kept constant.

(High-temperature Gas Flow)

The gas nozzle had a slit width of 0.5 mm and used air was maintained at 3.6 $m^3/h$ at 50° C. under 1 atmospheric pressure. The high-temperature gas was maintained at 200° C.

(Processability)

The amount of extrusion was set such that the fiber diameter D50 is 6.0±0.1 μm as measured with an evaluation method of a fiber diameter to be described hereinafter.

(Evaluation of Fiber)

One fiber was sampled from each nozzle and the thickness thereof was measured with an optical microscope. Specifically, the fibers were extruded from 501 nozzle holes, and sampled from each nozzle 3 times at 5-minute intervals. The thickness of the sampled fiber was measured at any position to obtain an entire fiber size distribution. The average fiber diameter and standard deviation were obtained from the fiber size distribution, and a coefficient of variation was further obtained. The smaller the average fiber diameter a fiber had, the more efficiently it was drawn, and the smaller the coefficient of variation a fiber had, the more uniformly it was formed.

(Fine Particulation)

A known mechanical pulverizer was used for pulverization. In this Example, the fiber was precut to have a length of several millimeters by a known cutter mill before fed to the pulverizer.

Figure 14:
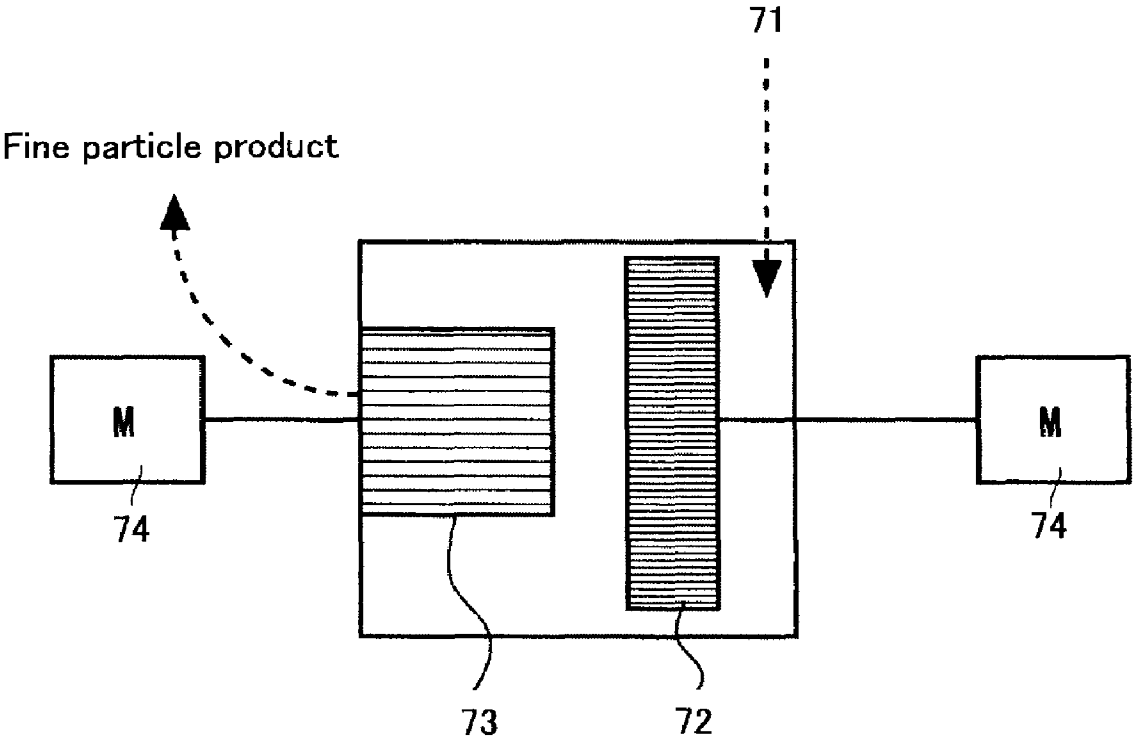
FIG. 14 shows a schematic view of an example of a structure of a pulverizer equipped with a built-in classifier.

It is commonly known that pulverizers such as KRIPTRON by Kawasaki Heavy Industries, Ltd., a turbo mill by TURBO KOGYO CO., LTD. and an inomizer by Hosokawa Micron Corporation can be used. Here, a mechanical pulverizer equipped with a built-in classifier was used, such as a pulverizer having therein a rotary wind-driven classifying mechanism and equipped with a spinning rotor type pulverizing rotor, like the foregoing inomizer, for convenience of arranging laboratory equipment. FIG. 14 shows a structure of the pulverizer equipped with a built-in classifier.

The pulverizer includes a pulverizing rotor 72 having a diameter of approximately 30 cm and a classifying rotor 73 having a diameter of approximately 18 cm, which are integrated in a cylinder container.

The pulverization condition was adjusted such that D50=6.0±0.1 μm is established by maintaining the number of rotations of the pulverizing rotor 72 at 8,000 rpm and varying the number of rotations of the classifying rotors 73. The feeding amount of the raw material 71 was adjusted to a condition that the pulverizing rotor 72 had a consumption power of 8 kW.

The fine particulation was evaluated by comparing a CV value obtained from particle size distribution, and a power per unit processed amount obtained from a total power required for pulverization with the pulverizing power of 8 kW and classification. The total power was obtained in such a way that an idle value of each of pulverizing and classifying motors 74 were obtained beforehand, and then the idle value was subtracted from a power of running.

Next, each example will be explained.

TABLE B-1

| | Supply amount of gas based on 100 parts by mass of resin | Type of gas | Porosity % | Nozzle temperature ° C. |
|---|---|---|---|---|
| Comparative Example B-1 | 0 | — | 0 | 200 |
| Comparative Example B-2 | 0 | — | 0 | 220 |
| Comparative Example B-3 | 0.200 | air | 64 | 200 |
| Example B-1 | 0.065 | air | 37 | 200 |
| Example B-2 | 0.100 | $CO_2$ | 39 | 200 |
| Example B-3 | 0.100 | $CO_2$/supercritical | 39 | 200 |

In Comparative Examples B-1 and B-2, a conventional technology was used.

In Comparative Example B-3, excess amount of air was mixed so as to form excessive air gaps.

In Example B-1, air was mixed in a resin to form air gaps.

In Example B-2, $CO_2$, which has a high solubility to the resin, was mixed in the resin.

In Example B-3, pressure resistance was provided in upstream of the spinning die so as to mix $CO_2$ in the resin in a supercritical state.

The supply amounts and types of gas, porosity and nozzle temperatures are shown in Table B-1.

TABLE B-2

| | Fiber diameter μm | Fiber diameter CV | Processed amount kg/h | Extrusion pressure Mpa |
|---|---|---|---|---|
| Comparative Example B-1 | 6.1 | 10.2 | 2.8 | 2.1 |
| Comparative Example B-2 | 6.0 | 10.5 | 3.1 | 1.9 |
| Comparative Example B-3 | 6.1 | 15.6 | 3.7 | 1.9 |
| Example B-1 | 6.0 | 11.3 | 3.9 | 1.5 |
| Example B-2 | 5.9 | 10.1 | 4.6 | 1.4 |
| Example B-3 | 5.9 | 9.4 | 4.6 | 8.0 |

Table B-2 shows CV values indicative of evaluation criteria of a fine particle precursor, processed amounts and extrusion pressures as determined on the assumption that the fiber diameters are the same.

The CV values of the fiber diameter were good in Comparative Examples B-1 and B-2, and Examples B-2 and B-3. The CV value was rather bad in Example B-1. This might be attributed to the fact that the CV values in Comparative Examples were good because the fine particle precursors originally contain no air gaps inside and thus are uniform inside, whereas the CV value was bad in Example B-1 because the fine particle precursor was not uniform inside due to the presence of internal air bubbles. In Examples B-2 and B-3, some or all of the gas was dissolved in the resin and air gaps were uniformly generated, thus the CV values might be improved to a level comparable to the CV value obtained before the gas was mixed in the resin. The extrusion pressures of Examples B-1 and B-2 were lower than that of Comparative Example B-2 in which the nozzle temperature was higher, and extrusion efficiency was improved.

In Example B-3, the extrusion pressure was high because a pressure resistance was provided to obtain a supercritical state.

In Comparative Example B-3, the CV value of the fiber diameter was high. The change of fibrous shape due to air bubbles and variations in discharge amount might excessively affected the CV value, because of an excess amount of mixed gas.

TABLE B-3

| | Classifying rotor power kw | Total power kw | Processed amount kg/h | Particle diameter D50 μm | Particle diameter CV | Consumption power per unit processed amount kwh/kg |
|---|---|---|---|---|---|---|
| Comparative Example B-1 | 3.5 | 11.5 | 17.9 | 6.1 | 15.1 | 6.42E−01 |
| Comparative Example B-2 | 3.4 | 11.4 | 18.2 | 6.1 | 15.4 | 6.26E−01 |

TABLE B-3-continued

| | Classifying rotor power kw | Total power kw | Processed amount kg/h | Particle diameter D50 μm | Particle diameter CV | Consumption power per unit processed amount kwh/kg |
|---|---|---|---|---|---|---|
| Comparative Example B-3 | 3.4 | 11.4 | 35.1 | 6.1 | 26.8 | 3.25E−01 |
| Example B-1 | 3.5 | 11.5 | 26.5 | 6.0 | 14.7 | 4.34E−01 |
| Example B-2 | 3.3 | 11.3 | 26.1 | 5.9 | 9.6 | 4.33E−01 |
| Example B-3 | 3.4 | 11.4 | 26.4 | 6.0 | 8.4 | 4.32E−01 |

Table B-3 shows results of fine particulation. Consequently, the total power of experiment was approximately equal in each condition, because the power load of the pulverizing rotor and power load of the classifying rotor, which controlled the power load of the pulverizing rotor at constant, might depend on accumulation in the apparatus. However, with regard to the consumption power per unit processed amount, Examples were approximately equally better than Comparative Examples. In Examples B-1 to B-3, it was considered that the fine particle precursor was promptly pulverized into an appropriate size in the pulverizer and quickly passed through the classifying rotor. In the fibrous precursor having air gaps inside of Examples B-1 to B-3, the processed amount was increased, compared to Examples B-1 and B-2. With regard to the condition of the classifying rotor which maintained the particle diameter D50 of the product, Examples B-1 and B-3 were good, and Example B3 which might have more uniform air gaps was best, and followed by Example B-2.

In Example B-1, the CV value of the fiber diameter was slightly worse than that in Comparative Examples in case of the fibrous precursor. The CV value in Example B-1 was better than that in Comparative Examples in case of fine particulation. In Example B-1, the fiber diameter variation caused upon fine particulation largely affected variation in size of the fine particles as final-products, compared to the fiber diameter variation caused when making the precursor to a fibrous shape.

In Comparative Example B-3, the consumption power per unit processed amount was decreased but the CV value was increased. The increase of the CV value was caused by a high CV value of the fibrous precursor and particularly an increased amount of fine powder. In the Examples of the second embodiment of the present invention, generation of coarse particles are suppressed in the classifier contained in the pulverizer. However, excess pulverization caused by collision with a crushing hammer or the classifying rotor cannot be suppressed. In Comparative Example B-3, the precursor had an excessively-high porosity and was structurally weak, so that fine cracks might be easily generated and a larger amount of fine powder might be generated by breaking a structure of the precursor.

It can be learned from the above results that the method for pulverizing a fibrous fine particle precursor which has been processed to have air gaps inside showed more uniform particle diameter and smaller energy consumption than conventional methods for pulverizing fibrous fine particle precursor. More uniform particle diameter can be obtained when the gas for forming air gaps is mixed in the supercritical state so as to form air bubbles.

What is claimed is:

1. An apparatus for producing a toner precursor comprising:

a nozzle unit which comprises nozzles each comprising a nozzle hole and a flow path, and a gas nozzle unit which comprises gas nozzles and a gas flow path, the flow path tapering toward the nozzle hole at an angle of 2° to 20° relative to a direction of a nozzle axis, the gas flow path tapering toward the nozzle hole at an angle of 15° to 33° relative to the direction of the nozzle axis, the shortest distance between the center of the nozzle hole and the gas nozzle being 0.5D to 3D, where D represents a circle-converted diameter of an outlet opening of the nozzle hole, wherein a toner constituent material is extruded from the nozzle controlled at 150° C. to 320° C., and drawn by a gas flow from the gas nozzle so as to be a fibrous fluid, while controlling a flow rate, and wherein the toner constituent material comprises a raw material A comprising at least a resin and pigment, and a raw material B comprising at least one of a low melting point resin, wax and organic solvent.

2. The apparatus for producing a toner precursor according to claim 1, wherein the outlet opening of the nozzle is a circular shape and has a circularity of 0.9 or more.

3. The apparatus for producing a toner precursor according to claim 1, wherein the flow path leading to the outlet opening of the nozzle has a straight body part, and the straight body part has a length of 5D to 15D.

4. The apparatus for producing a toner precursor according to claim 1, wherein the gas nozzles have a slit-shape and are of the same width, the gas nozzles are disposed in parallel across the nozzle, and the gas nozzles have a laval structure.

5. The apparatus for producing a toner precursor according to claim 1, further comprising an extruder, wherein the nozzle unit comprises a plurality of aligned nozzle holes, wherein a distribution flow path to each fan-shaped unit which is disposed in each of the plurality of nozzle holes is a tournament-form flow path having a mixing function, and wherein the raw material A is mixed and kneaded by the extruder, and then the raw material A is sufficiently mixed with the raw material B.

6. A method for producing a toner precursor comprising:

mixing and kneading two kinds of raw materials so as to produce a mixture fluid, controlling a flow rate of the mixture fluid, and extruding and drawing the mixture fluid from a nozzle by a gas supplied to a nozzle tip so as to be processed to a fibrous fine particle precursor, wherein the method for producing a toner precursor using an apparatus for producing the toner precursor comprises a nozzle unit which comprises the nozzles each comprising a nozzle hole and a flow path, and a gas nozzle unit which comprises gas nozzles and a gas flow path, the flow path tapering toward the nozzle hole at an angle of 2° to 20° relative to a direction of a nozzle axis, the gas flow path tapering toward the nozzle hole at an angle of 15° to 33° relative to the direction of the nozzle axis, the shortest distance between the center of the nozzle hole and the gas nozzle being 0.5D to 3D, where D represents a circle-converted diameter of an outlet opening of the nozzle hole, wherein a toner constituent material is extruded from the nozzle controlled at 150° C. to 320° C. and drawn by a gas flow from the gas nozzle so as to be a fibrous fluid, while controlling the flow rate, and wherein the toner constituent material comprises a raw material A comprising at least a resin and pigment and a raw material B comprising at least one of a low melting point resin, wax and organic solvent.

7. An apparatus for producing an electrophotographic toner comprising:

an apparatus for producing a toner precursor, a unit configured to cut and process the obtained toner precursor from the apparatus for producing a toner precursor, and a unit configured to pulverize the cut and processed toner precursor, wherein the apparatus for producing a toner precursor comprises a nozzle unit which comprises nozzles each comprising a nozzle hole and a flow path, and a gas nozzle unit which comprises gas nozzles and a gas flow path, the flow path tapering toward the nozzle hole at an angle of 2° to 20° relative to a direction of a nozzle axis, the gas flow path tapering toward the nozzle hole at an angle of 15° to 33° relative to the direction of the nozzle axis, the shortest distance between the center of the nozzle hole and the gas nozzle being 0.5D to 3D, where D represents a circle-converted diameter of an outlet opening of the nozzle hole, wherein a toner constituent material is extruded from the nozzle controlled at 150° C. to 320° C., and drawn by a gas flow from the gas nozzle so as to be a fibrous fluid, while controlling a flow rate, and wherein the toner constituent material comprises a raw material A comprising at least a resin and pigment and a raw material B comprising at least one of a low melting point resin, wax and organic solvent.

* * * * *

UNITED STATES PATENT AND TRADEMARK OFFICE

CERTIFICATE OF CORRECTION

PATENT NO. : 7,662,534 B2
APPLICATION NO. : 11/852611
DATED : February 16, 2010
INVENTOR(S) : Kinoshita et al.

It is certified that error appears in the above-identified patent and that said Letters Patent is hereby corrected as shown below:

On the title page, Item (73), the Assignee information is incorrect. Item (73) should read:

-- (73) Assignee: Ricoh Company, Ltd., Tokyo (JP) --

Signed and Sealed this

Thirty-first Day of August, 2010

David J. Kappos
*Director of the United States Patent and Trademark Office*